(12) United States Patent
Segal et al.

(10) Patent No.: US 10,574,684 B2
(45) Date of Patent: Feb. 25, 2020

(54) LOCALLY DETECTING PHISHING WEAKNESS

(71) Applicant: XM Ltd., Hertzelia (IL)

(72) Inventors: Ronen Segal, Hertzelia (IL); Menahem Lasser, Kohav-Yair (IL)

(73) Assignee: XM Cyber Ltd., Hertsliya (IL)

( * ) Notice: Subject to any disclaimer, the term of this patent is extended or adjusted under 35 U.S.C. 154(b) by 133 days.

(21) Appl. No.: 15/879,726

(22) Filed: Jan. 25, 2018

(65) Prior Publication Data

US 2019/0014141 A1 Jan. 10, 2019

Related U.S. Application Data

(60) Provisional application No. 62/530,222, filed on Jul. 9, 2017.

(51) Int. Cl.
*H04L 29/06* (2006.01)
*G06F 21/55* (2013.01)

(52) U.S. Cl.
CPC ........ *H04L 63/1433* (2013.01); *G06F 21/554* (2013.01); *H04L 63/1416* (2013.01); *H04L 63/1483* (2013.01)

(58) Field of Classification Search
CPC ............. H04L 63/1433; H04L 63/1416; H04L 63/1483; H04L 63/168; G06F 13/00; G06F 15/173; G06F 21/00; G06F 21/554; G01R 31/08
See application file for complete search history.

(56) References Cited

U.S. PATENT DOCUMENTS

| | | | |
|---|---|---|---|
| 6,952,779 B1 | 10/2005 | Cohen et al. | |
| 7,013,395 B1 | 3/2006 | Swiler et al. | |
| 7,757,293 B2 | 7/2010 | Caceres et al. | |
| 8,001,589 B2 | 8/2011 | Ormazabal et al. | |
| 8,112,016 B2 | 2/2012 | Matsumoto et al. | |
| 8,127,359 B2 | 2/2012 | Kelekar | |
| 8,356,353 B2 | 1/2013 | Futoransky et al. | |
| 8,365,289 B2* | 1/2013 | Russ ................... | H04L 63/1433 713/188 |

(Continued)

FOREIGN PATENT DOCUMENTS

| | | |
|---|---|---|
| CN | 103200230 A | 7/2013 |
| CN | 104009881 A | 8/2014 |

(Continued)

OTHER PUBLICATIONS

CN103200230 Machine Translation (by EPO and Google) published Jul. 10, 2013 Li Qianmu.

(Continued)

*Primary Examiner* — Thanhnga B Truong
(74) *Attorney, Agent, or Firm* — Marc Van Dyke; Momentum IP Group

(57) ABSTRACT

Methods and systems of testing for phishing security vulnerabilities are disclosed, including methods of penetration testing of a network node by a penetration testing system comprising a reconnaissance agent software module installed in the network node, and a penetration testing software module installed on a remote computing device. Penetration testing systems are provided so as to locally detect weaknesses that would expose network nodes to phishing-based attacks.

14 Claims, 17 Drawing Sheets

(56) References Cited

U.S. PATENT DOCUMENTS

| | | |
|---|---|---|
| 8,490,193 B2 | 7/2013 | Sarraute Yamada et al. |
| 8,650,651 B2 | 2/2014 | Podjarny et al. |
| 8,813,235 B2 | 8/2014 | Sidagni |
| 9,076,013 B1 | 7/2015 | Bailey, Jr. et al. |
| 9,183,397 B2 | 11/2015 | Futoransky et al. |
| 9,224,117 B2 | 12/2015 | Chapman |
| 9,270,696 B2 | 2/2016 | Fritzson et al. |
| 9,276,952 B2 | 3/2016 | Simpson et al. |
| 9,292,695 B1 | 3/2016 | Bassett |
| 9,350,753 B2 | 5/2016 | Kaplan et al. |
| 9,473,522 B1 | 10/2016 | Kotler et al. |
| 9,558,355 B2 | 1/2017 | Madou et al. |
| 2005/0086502 A1 | 4/2005 | Rayes et al. |
| 2007/0204347 A1 | 8/2007 | Caceres et al. |
| 2008/0209567 A1 | 8/2008 | Lockhart et al. |
| 2008/0288822 A1 | 11/2008 | Wu et al. |
| 2009/0038010 A1* | 2/2009 | Ma .................. G06F 11/3672 726/23 |
| 2009/0172813 A1 | 7/2009 | Aaron |
| 2010/0138925 A1 | 6/2010 | Barai et al. |
| 2010/0235918 A1* | 9/2010 | Mizrahi ............. H04L 63/1416 726/25 |
| 2011/0035803 A1 | 2/2011 | Lucangeli Obes et al. |
| 2012/0174228 A1 | 7/2012 | Giakouminakis et al. |
| 2014/0173739 A1 | 6/2014 | Ahuja et al. |
| 2014/0237606 A1 | 8/2014 | Futoransky et al. |
| 2016/0044057 A1 | 2/2016 | Chenette et al. |
| 2016/0248800 A1 | 8/2016 | Ng et al. |
| 2016/0275289 A1 | 9/2016 | Sethumadhavan et al. |
| 2016/0342796 A1 | 11/2016 | Kaplan et al. |
| 2016/0352771 A1 | 12/2016 | Sivan et al. |
| 2017/0098086 A1 | 4/2017 | Hoernecke et al. |
| 2017/0116421 A1 | 4/2017 | M C et al. |

FOREIGN PATENT DOCUMENTS

| | | |
|---|---|---|
| CN | 103916384 A | 4/2017 |
| EP | 1559008 A1 | 4/2017 |
| WO | WO0038036 A2 | 4/2017 |
| WO | WO2010069587 A1 | 4/2017 |
| WO | WO2013087982 A1 | 4/2017 |
| WO | WO2015111039 A1 | 4/2017 |
| WO | WO2016164844 A1 | 4/2017 |

OTHER PUBLICATIONS

CN103916384 Machine Translation (by EPO and Google) published on Apr. 6, 2017 Zhong et al.

CN104009881 Machine Translation (by EPO and Google) published on Aug. 27, 2014 Wang et al.

\* cited by examiner

LOCALLY DETECTING PHISHING WEAKNESS

CROSS-REFERENCE TO RELATED APPLICATIONS

This patent application claims the benefit of U.S. Provisional Patent Application No. 62/530,222 filed on Jul. 9, 2017, which is incorporated herein by reference in its entirety.

FIELD OF THE INVENTION

The present invention relates to systems and methods for penetration testing of a network node to determine vulnerability to phishing attacks. In particular, the present invention is suitable for penetration testing in networked systems, in order to locally detect weaknesses that would expose network nodes to phishing-based attacks.

BACKGROUND

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization or even of only a portion of it might cause significant damage, up to completely shutting down all operations. Additionally, all data of the organization exists somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet at least through one computing node, they are subject to attacks by computer hackers or by hostile adversaries. Quite often the newspapers are reporting incidents in which websites crashed, sensitive data was stolen or service to customers was denied, where the failures were the results of hostile penetration into an organization's networked computing system.

As a result, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even rich organizations that can afford hiring talented experts as in-house red teams do not achieve good protection. Testing for vulnerabilities of a large network containing many types of computers, operating systems, network routers and other devices is both a very complex and a very tedious process. The process is prone to human errors of missing testing for certain threats or misinterpreting the damages of certain attacks. Also, because a process of full testing against all threats is quite long, the organization might again end with a too long discovery period after a new threat appears.

Because of the above difficulties several vendors are proposing automated penetration testing systems. Such systems automatically discover and report vulnerabilities of a networked system, potential damages that might be caused to the networked system, and potential trajectories of attack that may be employed by an attacker.

Automatic penetration testing systems can be divided into those that are actual-attack penetration testing systems and those that are not. Actual-attack penetration testing systems are characterized by using actual attacks in order to validate that a given vulnerability is indeed applicable to a given network node and is effective in compromising it under current conditions of the node. Such systems do not need to know in advance whether conditions required for the vulnerability to be effective are satisfied. An attempt is made to compromise the given network node using the given vulnerability. If the attempt succeeds in compromising the node then the penetration testing system concludes the vulnerability is effective, and if it fails to compromise the node then the penetration testing system concludes the vulnerability is not effective.

On the other hand, in penetration testing systems that are not actual-attack penetration testing systems the validation of the effectiveness of a given vulnerability to a given network node is judged by collecting factual data about the given node and then evaluating the effectiveness of the vulnerability when applied to the given node according to rules retrieved from a security vulnerabilities knowledge base or according to a simulation. In such systems, unlike in actual-attack penetration testing systems, there is no risk of the penetration test compromising the tested networked system. This difference is of high importance to many organizations and is the reason why those organizations refrain from using actual-attack penetration testing systems.

One of the threats faced by organizations in recent years is "phishing". Phishing is an attempt to obtain sensitive information such as usernames, passwords, credit card details, or other confidential information (and in some cases indirectly obtain money), by disguising as a trustworthy entity in an electronic communication or by other means. "Spear phishing" is an attempt of phishing directed at specific individuals or companies, and is the most common type of phishing today.

In a typical phishing attack a user receives an email which, on first glance, seems to come from a trusted source—the user's bank, the user's credit card company, etc.

The email asks the user to execute some operation, for example to confirm his account credentials. For that purpose, the user is asked to select a link appearing within the email in order to transfer to the website of the sending entity. Once the user follows the link, he is presented with a form into which he is requested to enter his credentials (e.g. user name and password). The innocent user thinks he is providing the credentials to a legitimate bank or credit card company, but in a phishing attack he is actually in a fake website owned by the attacker. Once the user provides the credentials in the fake website, the phishing attacker stores them and may later use them for fraudulently stealing money or information from the user.

It is not really necessary for achieving successful phishing that the user explicitly provides his credentials in the malicious website to which he was tempted to get. In many attacks, it is enough that the user selects a "poisoned link" embedded in an email or in a file attached to an email and the attacker may already be able to compromise the user's computing device by running malicious code in it.

For example, the poisoned link may take the user's browser to a malicious website that provides the browser with a web page containing malicious code. Most browsers have security vulnerabilities that are known to the attackers' community, and which allow code written by knowledgeable attackers to bypass the browser's security defenses and perform operations that compromise the hosting network node. Thus, the mere fact of tempting a user to follow a link to an attacker's website might be enough for compromising the user's network node, making phishing a highly dangerous threat that fails even experienced users that would never be tempted to explicitly expose their credentials.

Another very popular method of phishing attacks relies on attaching a "poisoned file" to an innocent-looking email, where the mere opening of the poisoned file by a user is enough for the attacker to succeed in compromising the user's computing device. Such attacks typically use a macro containing malicious code that is automatically executed when a file containing the macro is opened, as is common with Microsoft Office document files.

While phishing by email is currently the most common phishing attack, phishing attacks are not limited to emails. The message through which the phishing poisoned link is communicated to the targeted computing device is not necessarily an email message. Other types of messages (e.g. SMS messages) may also be carriers of a phishing poisoned link.

Additionally, while phishing by electronic communication is currently the most common phishing attack, phishing attacks are not limited to electronic communication. For example, an attacker may talk with an unsuspecting user on the phone and convince him to visit a web page containing malicious code. Another example is for an attacker to convince a user to insert a USB thumb drive into his computing device, when the USB drive contains auto-executing malicious phishing code or a file containing phishing poisoned links. The user may be tempted to use the USB drive by getting it as a free handout in an exhibition, by finding it thrown out in a parking lot, etc.

SUMMARY

Co-pending US provisional patent application 62/451,850, filed on Jan. 30, 2017, and co-pending U.S. patent application Ser. No. 15/874,429, filed on Jan. 18, 2018, are both incorporated herein by reference, each in its entirety. In the event of inconsistent usages between this document and those documents so incorporated by reference, the usage in the incorporated reference(s) should be considered supplementary to that of this document; for irreconcilable inconsistencies, the usage in this document controls.

The present disclosure relates to penetration testing systems, and to methods of conducting penetration testing, for determining vulnerability of network nodes to phishing attacks.

Embodiments of a method for penetration testing of a network node by a penetration testing system are disclosed, wherein the penetration testing system comprises a reconnaissance agent software module installed in the network node and a penetration testing software module installed on a remote computing device. The method comprises: sending to the network node, by the penetration testing software module, a test message containing at least one of an Internet link and an attachment file; detecting, by the reconnaissance agent software module installed in the network node, an event, the event being a member of a group consisting of an event of selecting of the Internet link by a user of the network node, an event of opening of the attachment file by the user of the network node, an event caused by the selecting of the Internet link, and an event caused by the opening of the attachment file; sending, by the reconnaissance agent software module installed in the network node, a reporting message to the remote computing device, the reporting message containing information concerning an occurrence of the detected event; making a determination, by the penetration testing software module, that the network node is vulnerable to an attack, the determination being based on the information concerning the occurrence of the detected event included in the reporting message; reporting the determination by the penetration testing software module, the reporting comprising at least one of: (i) causing a display device to display information about the determination, (ii) recording the information about the determination in a file, and (iii) electronically transmitting the information about the determination.

In some embodiments, the test message is an email message. In some embodiments, the test message is an SMS message. In some embodiments, the test message is a social network message. In some embodiments, the test message is a chat message.

In some embodiments, the detected event can be one of: the event of selecting the Internet link, and the event caused by the selecting of the Internet link. The Internet link can comprise an invalid or inactive Internet address. The Internet link can be contained in a body of the test message. The Internet link can be contained in a file attached to the test message. The detecting of the event can comprise detecting that the file containing the link has a specific name.

In some embodiments, the detected event is one of: the event of opening the attachment file, and the event caused by the opening of the attachment file. The detecting of the event can comprise detecting that the attachment file has a specific name.

In some embodiments, the detecting of the event comprises detecting an outgoing message sent by the network node and having a specific characteristic. The specific characteristic of the outgoing message can include a specific characteristic of the content of the outgoing message. The specific characteristic of the outgoing message can include a specific characteristic of the address to which the outgoing message is being sent. The specific characteristic of the address can be that the address is a specific address. The outgoing message can be an email message, with the specific characteristic of the address being that a domain name of the address is a specific domain name. The outgoing message can be an email message, with the specific characteristic of the address being that the address is a loopback address.

In some embodiments, the detecting of the event comprises detecting an execution of a specific executable file by the network node. The sending of the reporting message to the remote computing device can be caused by execution of code of the specific executable file. The sending of the reporting message to the remote computing device can be caused by execution of code of the reconnaissance agent software module that is not code of the specific executable file.

In some embodiments, the detecting of the event comprises detecting a specific registry-related operation. The specific registry-related operation can include writing into a specific registry key. The specific registry-related operation can include writing a specific value into a specific registry key.

In some embodiments, the detecting of the event comprises detecting a specific file-related operation. The specific file-related operation can include a creation of a new file inside a specific folder. The specific file-related operation can include a writing operation into a specific file. The specific file-related operation can include a reading operation from a specific file.

Embodiments of a method for penetration testing of a network node by a penetration testing system are disclosed, wherein the penetration testing system comprises a reconnaissance agent software module installed in the network node, and a penetration testing software module installed on a remote computing device. The method comprises: detecting, by the reconnaissance agent software module installed in the network node, an event, the event being a member of a group consisting of an event of accessing a specific Internet address by the network node, an event caused by the accessing of the specific Internet address by the network node, an event related to or caused by a portable storage device, and an event related to or caused by a shared folder to which the network node has access; sending, by the reconnaissance agent software module installed in the network node, a reporting message to the remote computing device, the reporting message containing information concerning an occurrence of the detected event; making a determination, by the penetration testing software module, that the network node is vulnerable to an attack, the determination being based on the information concerning an occurrence of the detected event in the reporting message; and reporting the determination by the penetration testing software module, the reporting comprising at least one of: (i) causing a display device to display information about the determination, (ii) recording the information about the determination in a file, and (iii) electronically transmitting the information about the determination.

In some embodiments, the detected event is one of: the event of accessing the specific Internet address by the network node, and the event caused by the accessing of the specific Internet address by the network node. The accessing of the specific Internet address can include manually typing the specific Internet address into an Internet browser by a user of the network node.

In some embodiments, the detected event is the event related to or caused by a portable storage device. The detecting of the event can comprise detecting that the portable storage device is being inserted into the network node and detecting that the portable storage device has a specific characteristic. The detecting of the event can comprise detecting that the portable storage device has a specific characteristic and detecting that a file having a first specific name that resides on the portable storage device is opened. The specific characteristic of the portable storage device can be a specific identification number of the portable storage device. The specific characteristic of the portable storage device can be a specific volume name of the portable storage device. The specific characteristic of the portable storage device can be having a file with a second specific name residing in the portable storage device.

In some embodiments, the event is the event related to or caused by a shared folder to which the network node has access. The detecting of the event can comprise detecting that a file having a specific name is retrieved from the shared folder and is opened. The detecting of the event can comprise detecting that a file having a specific name is retrieved from the shared folder and detecting that a link contained in the file is being selected.

In some embodiments, the detecting of the event comprises detecting an outgoing message sent by the network node and having a specific characteristic. The specific characteristic of the outgoing message can include a specific characteristic of the content of the outgoing message. The specific characteristic of the outgoing message can include a specific characteristic of the address to which the message is being sent. The specific characteristic of the address can be that the address is a specific address. The outgoing message can be an email message, with the specific characteristic of the address being that a domain name of the address is a specific domain name. The outgoing message can be an email message, with the specific characteristic of the address being that the address is a loopback address.

In some embodiments, the detecting of the event comprises detecting an execution of a specific executable file by the network node. The sending of the reporting message to the remote computing device can be caused by execution of code of the specific executable file. The sending of the reporting message to the remote computing device can be caused by execution of code of the reconnaissance agent software module that is not code of the specific executable file.

In some embodiments, the detecting of the event comprises detecting a specific registry-related operation. The specific registry-related operation can include writing into a specific registry key. The specific registry-related operation can include writing a specific value into a specific registry key.

In some embodiments, the detecting of the event comprises detecting a specific file-related operation. The specific file-related operation can include a creation of a new file inside a specific folder. The specific file-related operation can include a writing operation into a specific file. The specific file-related operation can include a reading operation from a specific file.

Embodiments of a method for penetration testing of a network node by a penetration testing system are disclosed, wherein the penetration testing system comprises a reconnaissance agent software module installed in the network node, and a penetration testing software module installed on a remote computing device. The method comprises: doing, by the penetration testing software module, at least one of (i) attempting to compromise the network node, and (ii) checking whether the network node can be compromised; in response to a result of the doing, if the attempting to compromise is successful or the checking concludes that the network node can be compromised, causing the performing of an operation by the network node, the operation selected from a group consisting of (i) sending an outgoing message having a specific characteristic out of the network node, (ii) executing a specific executable file, (iii) executing a specific registry-related operation, and (iv) executing a specific file-related operation; detecting, by the reconnaissance agent software module installed in the network node, an event of an occurrence of the operation; sending, by the reconnaissance agent software module installed in the network node, a reporting message to the remote computing device, the reporting message containing information concerning an occurrence of the detected event; making a determination, by the penetration testing software module, that the network node is vulnerable to an attack, the determining being based on the information concerning an occurrence of the detected event in the reporting message; and reporting the determination by the penetration testing software module, the reporting comprising at least one of: (i) causing a display device to display information about the determination, (ii) recording the information about the determination in a file, and (iii) electronically transmitting the information about the determination.

In some embodiments, the operation is the sending of an outgoing message having a specific characteristic out of the network node. The specific characteristic of the outgoing message can include a specific characteristic of the content of the message. The specific characteristic of the outgoing message can include a specific characteristic of the address to which the message is being sent. The specific characteristic of the address can be that the address is a specific address. The outgoing message can be an email message, with the specific characteristic of the address being that a domain name of the address is a specific domain name. The outgoing message can be an email message, with the specific characteristic of the address being that the address is a loopback address.

In some embodiments, the operation is the executing of a specific executable file. The sending of the reporting message to the remote computing device can be caused by execution of code of the specific executable file. The sending of the reporting message to the remote computing device can be caused by execution of code of the reconnaissance agent software module that is not code of the specific executable file.

In some embodiments, the operation is the executing of a specific registry-related operation. The specific registry-related operation can include writing into a specific registry key. The specific registry-related operation can include writing a specific value into a specific registry key.

In some embodiments, the operation is the executing of a specific file-related operation. The specific file-related operation can include a creation of a new file inside a specific folder. The specific file-related operation can include a writing operation into a specific file. The specific file-related operation can include a reading operation from a specific file.

In some embodiments, the doing at least one of attempting and checking includes sending to the network node a test message containing an Internet link. In some embodiments, the doing at least one of attempting and checking includes causing the network node to access a specific Internet address. In some embodiments, the doing at least one of attempting and checking includes the use of a portable storage device. In some embodiments, the doing at least one of attempting and checking includes the use of a shared folder to which the network node has access. In some embodiments, the doing at least one of attempting and checking includes sending to the network node a test message containing an attachment file.

Embodiments are disclosed in which a penetration testing system, for testing a network node on which a reconnaissance agent software module is installed, comprises: a remote computing device in electronic communication with the network node and comprising one or more processors, wherein a penetration testing software module of the penetration testing system is installed on the remote computing device; a first non-transitory computer-readable storage medium containing first program instructions, wherein execution of the first program instructions by one or more processors of the network node causes the one or more processors of the network node to carry out the following: (i) in response to receiving, from the penetration testing software module installed on the remote computing device, a test message containing at least one of an Internet link and an attachment file, detecting, by the reconnaissance agent software module, an event, the event being a member of a group consisting of an event of selecting of the link by a user of the network node, an event of opening of the attachment file by the user of the network node, an event caused by the selecting of the link, and an event caused by the opening of the attachment file, and (ii) sending, by the reconnaissance agent software module, a reporting message to the remote computing device, the reporting message containing information concerning an occurrence of the detected event; and a second non-transitory computer-readable storage medium containing second program instructions, wherein execution of the second program instructions by one or more processors of the remote computing device causes the one or more processors of the remote computing device to carry out the following: (i) in response to receiving the reporting message from the reconnaissance agent software module installed in the network node, making a determination, by the penetration testing software module, that the network node is vulnerable to an attack, the determination being based on the information concerning the occurrence of the detected event included in the reporting message, and (ii) reporting the determination by the penetration testing software module, the reporting comprising at least one of: (i) causing a display device to display information about the determination, (ii) recording the information about the determination in a file, and (iii) electronically transmitting the information about the determination.

Embodiments are disclosed in which a penetration testing system, for testing a network node on which a reconnaissance agent software module is installed, comprises: a remote computing device in electronic communication with the network node and comprising one or more processors, wherein a penetration testing software module of the penetration testing system is installed on the remote computing device; a first non-transitory computer-readable storage medium containing first program instructions, wherein execution of the first program instructions by one or more processors of the network node causes the one or more processors of the network node to carry out the following: (i) detecting, by the reconnaissance agent software module, an event, the event being a member of a group consisting of an event of accessing a specific Internet address by the network node, an event caused by the accessing of the specific Internet address by the network node, an event related to or caused by a portable storage device, and an event related to or caused by a shared folder to which the network node has access, and (ii) sending, by the reconnaissance agent software module, a reporting message to the remote computing device, the reporting message containing information concerning an occurrence of the detected event; and a second non-transitory computer-readable storage medium containing second program instructions, wherein execution of the second program instructions by one or more processors of the remote computing device causes the one or more processors of the remote computing device to carry out the following: (i) in response to receiving the reporting message from the reconnaissance agent software module installed in the network node, making a determination, by the penetration testing software module, that the network node is vulnerable to an attack, the determination being based on the information concerning the occurrence of the detected event included in the reporting message, and (ii) reporting the determination by the penetration testing software module, the reporting comprising at least one of: (i) causing a display device to display information about the determination, (ii) recording the information about the determination in a file, and (iii) electronically transmitting the information about the determination.

Embodiments are disclosed in which a penetration testing system, for testing a network node on which a reconnaissance agent software module is installed, comprises: a remote computing device in electronic communication with the network node and comprising one or more processors, wherein a penetration testing software module of the penetration testing system is installed on the remote computing device; a first non-transitory computer-readable storage medium containing first program instructions, wherein execution of the first program instructions by one or more processors causes the one or more processors to carry out the following: in response to a result of a doing by the penetration testing software module of at least one of (i) attempting to compromise the network node, and (ii) checking whether the network node can be compromised, if the attempting to compromise is successful or the checking concludes that the network node can be compromised, causing the performing of an operation by the network node, the operation selected from a group consisting of (i) sending an outgoing message having a specific characteristic out of the network node, (ii) executing a specific executable file, (iii) executing a specific registry-related operation, and (iv) executing a specific file-related operation; a second non-transitory computer-readable storage medium containing second program instructions, wherein execution of the second program instructions by one or more processors of the network node causes the one or more processors of the network node to carry out the following: (i) detecting, by the reconnaissance agent software module installed in the network node, an event of an occurrence of the operation, and (ii) sending, by the reconnaissance agent software module, a reporting message to the remote computing device, the reporting message containing information concerning an occurrence of the detected event; and a third non-transitory computer-readable storage medium containing third program instructions, wherein execution of the third program instructions by one or more processors of the remote computing device causes the one or more processors of the remote computing device to carry out the following: (i) in response to receiving the reporting message from the reconnaissance agent software module installed in the network node, making a determination, by the penetration testing software module, that the network node is vulnerable to an attack, the determination being based on the information concerning the occurrence of the detected event included in the reporting message, and (ii) reporting the determination by the penetration testing software module, the reporting comprising at least one of: (i) causing a display device to display information about the determination, (ii) recording the information about the determination in a file, and (iii) electronically transmitting the information about the determination.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE EMBODIMENTS

Figure 1:
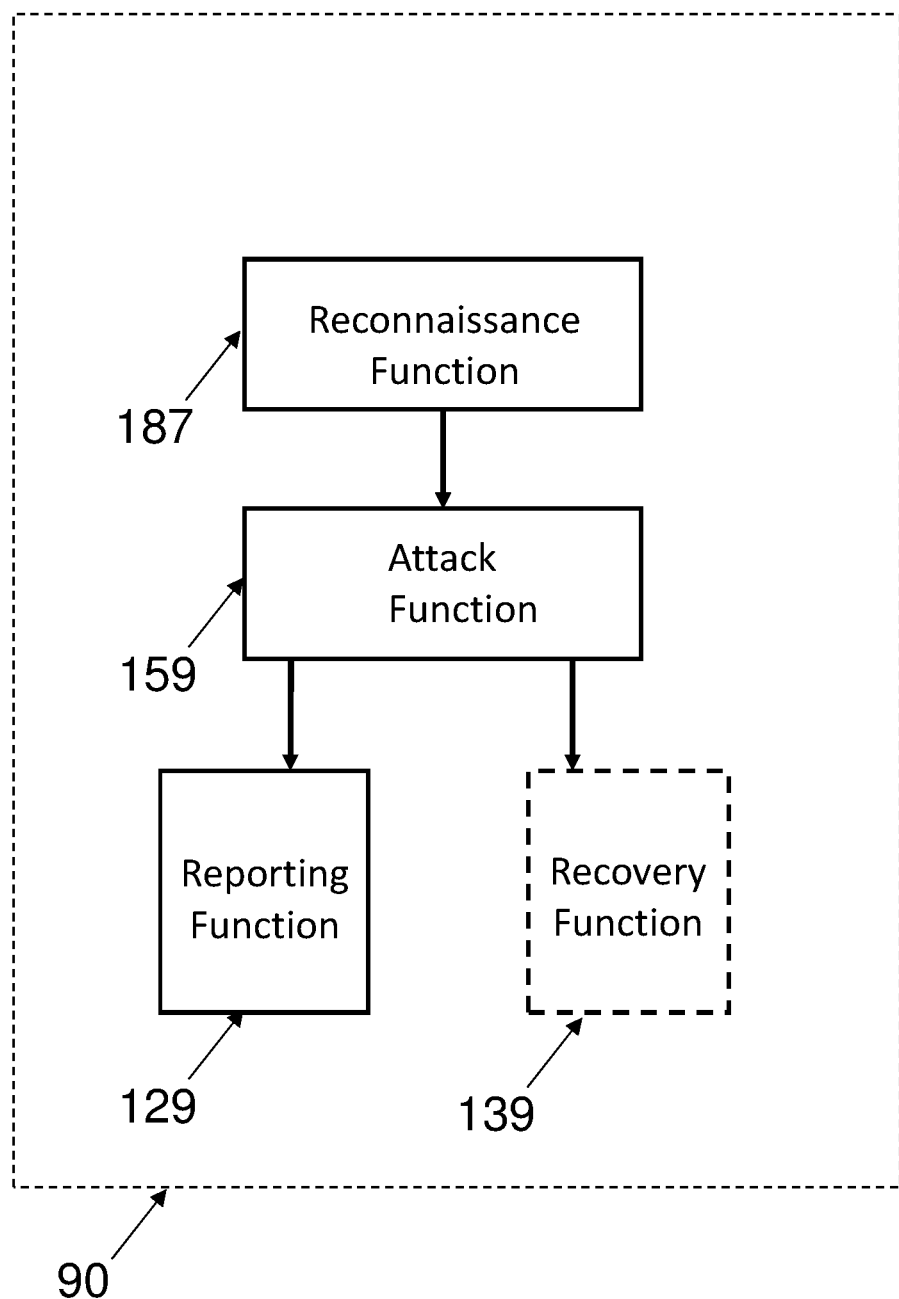
FIG. 1 is a functional block diagram of a prior art penetration testing system.

A CISO (Computer Information Security Officer) of an organization has to be concerned about phishing attacks against employees of his organization. In this case the goals of the attacker are typically not stealing money from employees, but stealing confidential information from the organization. Once the credentials of an employee are available to an attacker, all access rights of the employee within the organization are also available to the attacker.

As a result, a CISO would typically want a penetration test to also provide an evaluation of the organization's level of vulnerability against phishing expeditions by potential attackers.

The typical way of making such an evaluation is by sending employees of the organization emails that look like real phishing emails in the sense of pretending to be innocent emails, for example pretending to come from an administrator of the networked system of the organization or from a respectable technical institution outside the organization. If this would have been a real phishing email, then once a user follows a link embedded in the phishing email, an attacker may be able to compromise his network node and then take advantage of this for getting hold of sensitive and confidential information of the organization. But as this is a test phishing email, selecting the poisoned link should not cause any damage. Instead, selecting the link is only used for determining the fact that this user ignored the security guidelines of the organization of not following unknown and questionable links.

The prior art phishing testing systems operate by sending phishing emails to employees of the organization, the emails containing links that once selected cause the network node to send a message to a dedicated phishing web server that lets it know about the event of selecting the link. The phishing dedicated server is thus able to compile a list of uncareful employees that might put the organization at risk.

However, the need for establishing a dedicated web server for receiving the messages reporting the events of users selecting phishing links is a disadvantage of the above solution. It is a burden on the administrators and security team of the tested organization. It is therefore desirable to find a way of conducting a phishing vulnerability test in an organization without having to establish a dedicated phishing web server for receiving phishing-caused messages.

The proposed solution is to include the phishing testing functionality within a penetration testing system that uses reconnaissance client agents that are installed in the nodes of the tested networked system and report data of the hosting network nodes. Each reconnaissance client agent looks for and reports events occurring in its hosting network node which are caused by a success of a phishing attempt.

US provisional patent application No. 62/451,850, and U.S. patent application Ser. No. 15/874,429, which have been incorporated herein by reference, disclose an architecture of an automated penetration testing system that is using reconnaissance client agents.

FIG. 1 shows a functional block diagram of a typical penetration testing system 90 of the prior art. The penetration system 90 comprises a reconnaissance function 187, an attack function 159, a reporting function 129 and an optional recovery function 139.

Figure 2:
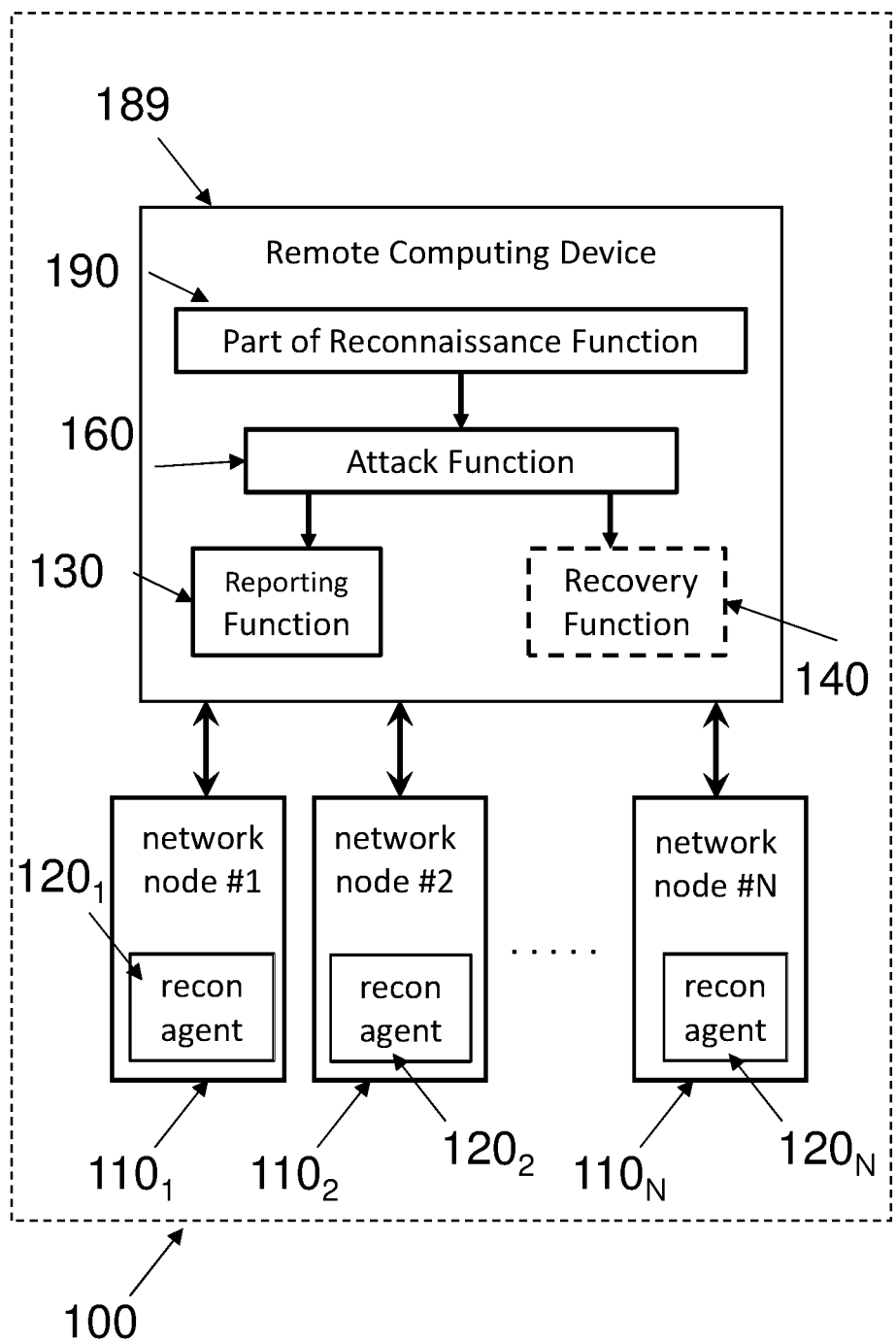
FIG. 2 is a functional block diagram of a reconnaissance agent penetration testing system according to some embodiments.

FIG. 2 shows a functional block diagram of a penetration testing system 100 according to some embodiments, comprising a reconnaissance function as defined as definition "14" in the Definitions Section later in this specification. The reconnaissance function includes functionality in reconnaissance agents 120 ($120_1$, $120_2$, . . . $120_N$) installed in respective network nodes 110 ($110_1$, $110_2$, . . . $110_N$) and, in some embodiments, also includes functionality in a remote computing device 189 in which is installed "part of reconnaissance function" 190. In some embodiments, an attack function 160, as defined as definition "15" in the Definitions Section, a reporting function 130 as defined as definition "16" in the Definitions Section, and optionally a recovery function 140 (also known in the industry as a 'clean-up' function and synonymous therewith), as defined as definition "17" in the Definitions Section, are all installed in the remote computing device 189. As explained in definition "15", an 'attack function' forms part of the architecture of every penetration testing system and performs the function of determining whether one or more security vulnerabilities exist in the tested networked system. In an alternative embodiment (NOT SHOWN), one or more network nodes of the tested networked system act as the remote computing device, so that any or all of the above-listed functions are installed in network nodes 110 instead of in a physically-remote remote computing device 189, or, alternatively, the functionality of the remote computing device 189 of FIG. 2 is split between the physically-remote remote computing device 189 and the network nodes 110.

As already explained, a reconnaissance client agent is a software module designed to be installed in nodes of the tested networked system. A reconnaissance client agent is able to communicate with a remote computing device hosting a penetration testing software module of the penetration testing system that is responsible for managing and conducting the penetration testing process. A reconnaissance client agent detects events occurring in its hosting node and reports them to the remote computing device. The reported events may include (but are not necessarily limited to) multiple types of events occurring in the hosting node, and specifically may include events related to file operations, outgoing network messages and registry operations.

Looking first at email-based phishing, the basic idea of the proposed solution is that as there is already a reconnaissance client agent in a network node being tested for phishing, there is no need for the sending of phishing-related messages to a dedicated server. Instead, we use the locally-installed agent for detecting and reporting the events of the user selecting phishing links, and the links can point to an invalid Internet address, or to an inactive Internet address.

Thus, the penetration testing system conducts a phishing test by sending phishing test mails to a group of employees of the tested organization. In each network node that receives a phishing test mail, the local reconnaissance agent locally detects any event of the user selecting a poisoned phishing link, and then reports the event to the penetration testing system (as it may do for other events that are of interest for penetration testing in general). No server dedicated for receiving phishing messages is established, neither within the tested networked system nor outside it.

A poisoned phishing link may be embedded inside a phishing test mail either by being embodied in the body of the mail or by being embedded in a file attached to the mail.

The following examples illustrate ways by which the phishing test emails and the reconnaissance client agent can cooperate for implementing the proposed solution. The common denominator of all examples is that an event of a user selecting a phishing link is detected locally within the relevant network node, and not remotely in a server that receives messages from that network node.

In a first example, the selecting of a phishing link in the phishing mail causes a network message to be sent to a specific address, known to the local agent. The agent monitors outgoing network messages and detects the transmission of the phishing-caused message by identifying the specific address, thus finding out about the success of the phishing attempt. Note that it does not matter whether the specific address corresponds to a real server or not, as the detection of the phishing success is achieved at the sending side of the message, rather than at the receiving side, and thus the effort and expense of setting up a server to receive the messages can be saved.

Methods by which the reconnaissance agent can detect the sending of a network message addressed to a specific address are well known in the art, and any such method can be used for implementing the proposed solution.

The phishing link is typically an HTTP link, and therefore the network message that should be detected is an HTTP message. Such message can be detected by monitoring outgoing HTTP GET requests or by monitoring TCP SYN packets, looking for messages having the specific address. Another method is to monitor outgoing DNS request packets, looking for requests asking to resolve the specific address. The monitoring can be done by running a standard network sniffer (e.g. PCAP in Windows), with a filter set up for matching the desired message type and address. Alternatively, the monitoring can be done with a custom-made network driver that resides in the network driver level (NDIS in Windows), and is dedicated for detecting the desired message type and address.

In a second example, the selecting of a phishing link in the phishing mail causes a network message to be sent to "localhost", which is interpreted by the communication mechanism as an instruction for looping the message back to the sending host. Thus, no message is sent out of the network node, but the local reconnaissance agent can detect the event and identify it as a success of the phishing attempt. As messages to "localhost" may also be sent by other applications in the network node, the identification must rely not only on detecting a message to "localhost" but also on unique content of the message that identifies it as phishing-related.

Methods by which the reconnaissance agent can detect the sending of a network message addressed to a "localhost" are well known in the art, and any such method can be used for implementing the proposed solution.

The same methods for detecting outgoing network messages having a specific address that were listed above for the first example, can also be used for detecting outgoing network messages addressed to "localhost". However, it should be noted that in Windows NDIS version 5 there is no support for sniffing "localhost", while NDIS version 6 does support it. Therefore, when using a network sniffer in Windows (whether PCAP or other), one should make sure it is based on NDIS 6. No such issue exists for the Linux operating system.

In a third example, the selecting of a phishing link in the phishing mail causes execution of a specific local executable file. This executable file may be part of the reconnaissance agent and may be installed together with it. The event of executing the file provides the indication that the user had selected the poisoned link of the phishing test mail.

Methods by which the reconnaissance agent can detect the execution of a specific local executable file are well known in the art, and any such method can be used for implementing the proposed solution.

The specific executable file is typically provided by the vendor of the penetration testing system and installed in the network node at the same time the local reconnaissance agent is installed. Therefore, the file is under full control of the vendor and can be programmed to notify the local agent when being executed using any known method of inter-process communication. For example, the file may send a signal to the agent, or the agent may periodically poll for some event or condition depending on the file being executed.

Alternatively, the execution of the specific file may be detected by the local agent without requiring active cooperation by the executable file. For example, the agent may use the Windows Management Instrumentation (WMI) infrastructure of the Windows Operating System for detecting the process created for executing the file. WMI is the Microsoft implementation of Web-Based Enterprise Management (WBEM), which is an industry initiative to develop a standard technology for accessing management information in an enterprise environment. Using WMI, the agent can get a notification for every new created process. After being notified about a new process, the agent can determine the executable file that corresponds to the process. Another way for the agent to detect the file's process is for the agent to query for the list of running processes. This is supported by the Win32 API of the Windows Operating System. A similar API exists in the Linux OS, and the same list can also be obtained by enumerating the Linux "/proc" directory. The agent can poll the processes list once per a specific short time interval and detect new processes that were created since its previous polling of the list.

In a fourth example, the selecting of a phishing link in the phishing mail causes writing of a specific value into a specific key of the registry. The reconnaissance agent watches the specific registry key for writing operations, and when detecting such registry write operation knows that the user had selected the poisoned link of the phishing test mail.

Methods by which the reconnaissance agent can detect the writing of a specific value into a specific key of the registry are well known in the art, and any such method can be used for implementing the proposed solution.

For example, Windows provides a dedicated WinAPI function called RegNotifyChangeKeyValue for this purpose (see https://msdn.microsoft.com/en-us/library/windows/desktop/ms724892(v=vs.85).aspx). The caller of this function may use it to be notified when the value of the specific key is changed, and after being notified can check whether the new value is the specific value.

In a fifth example, the selecting of a phishing link in the phishing mail causes the creation of a file inside a specific folder. The reconnaissance agent watches the specific folder for file creation operations, and when detecting such file creation operation knows that the user had selected the poisoned link of the phishing test mail.

Methods by which the reconnaissance agent can detect the creation of a file inside a specific folder are well known in the art, and any such method can be used for implementing the proposed solution.

For example, Windows provides a set of WinAPI functions (FindFirstChangeNotification, FindNextChangeNotification, FindCloseChangeNotification and ReadDirectoryChangesW) for this purpose (see https://msdn.microsoft.com/en-us/library/windows/desktop/aa364417(v=vs.85).aspx). The caller of the functions may use them to be notified when a file is created inside the specific folder. Also, the .NET Framework Class Library provides a built-in class for the same purpose—System.IO.FileSystemWatcher (see https://msdn.microsoft.com/en-us/library/system.io.filesystemwatcher(v=vs.110).aspx).

In a sixth example, the selecting of a phishing link in the phishing mail causes writing into a specific file. The reconnaissance agent watches the specific file for writing operations, and when detecting such writing operation knows that the user had selected the poisoned link of the phishing test mail.

Methods by which the reconnaissance agent can detect the writing into a specific file are well known in the art, and any such method can be used for implementing the proposed solution.

For example, the set of WinAPI notification functions listed in the previous example allows a caller to be notified when the last write-time of a file in the folder containing the specific file is changed. After being notified of such change, the caller may enumerate the files within the folder and find out whether it was the last write-time of the specific file that was changed. Alternatively, the agent can periodically poll the last write-time of the specific file without using change notifications.

In a seventh example, the selecting of a phishing link in the phishing mail causes reading from a specific file. The reconnaissance agent watches the specific file for reading operations, and when detecting such reading operation knows that the user had selected the poisoned link of the phishing test mail.

Methods by which the reconnaissance agent can detect the reading from a specific file are well known in the art, and any such method can be used for implementing the proposed solution.

As the WinAPI functions described above for the previous examples do not support watching for file read operations, detecting the reading of a specific file is typically implemented using a custom-made file system driver that monitors file reading operations while looking for the specific file name.

While the above discussion and examples dealt with email-based phishing, the proposed solution is not limited to emails. Other types of messages may be used for importing the phishing links into the tested network nodes. For example, SMS messages, social network messages (e.g. WhatsApp messages), chat messages, etc.

Similarly, the detected event caused by the success of the phishing attempt may be the sending of a non-network message having some specific characteristic, such as an SMS message or a social network message.

Methods by which the reconnaissance agent can detect the sending of an SMS message or a social network message having a certain characteristic are well known in the art, and any such method can be used for implementing the proposed solution.

For example, for SMS messages the Android operating system provides an option in one of the Settings screens to replace the default messaging application by another messaging application. Once such replacement takes effect, any SMS message is directed to the new application, which may inspect the message for the desired characteristic. If the characteristic is found then the message may be dropped, and if it is not found then it is forwarded to the default application to be handled as a normal message. Even in early versions of Android that might lack this feature, it is possible to create the same effect by programmatically hooking to the messaging service and capturing messages before they are processed by the default application. Similarly, some social networks may provide a mechanism for hooking into their messages path, thus supporting detection of messages having the desired characteristic.

Additionally, while the above discussion and examples dealt with phishing based on using electronic communication means for causing access to the malicious phishing code, the proposed solution is not limited to such means. For example, the testing phishing attack may be based on using manual means for causing a network node to access the malicious phishing code. In one case, the phishing test may employ distributing USB portable drives as free giveaways in a conference in which many employees of the tested organization participate. In another case, the phishing test may involve making phone calls by the testing team to multiple employees, trying to convince them to access a certain web page. Regardless of the means used for conducting the phishing test attack, the proposed solution detects the success of a phishing attack in each network node locally within that node, unlike prior art systems that detect it remotely in a remote server.

Also, the methods of the proposed solution are applicable not only to phishing attacks but also to other types of cyber-attacks. For examples, network nodes may be tested for vulnerability against a macro-based attack. In such an attack, a malicious file is imported into the network node, for example by a message sent to the network node containing the malicious file as an attachment or by placing the malicious file in a shared folder from which the network node routinely imports files. The malicious file typically contains a macro containing malicious code that is automatically executed when the file is opened. When executed, the malicious code might compromise the network node and achieve whatever goals the attacker had set for it to achieve. The methods of the proposed solution can be used for locally detecting by the reconnaissance agent software module that a user is opening a file imported from outside of the network node, and then reporting this to the penetration testing software module. Methods by which the reconnaissance agent can detect the opening of an imported file are well known in the art. For example, see US Provisional Patent Application No. 62/522,208, filed Jun. 20, 2017, and U.S. patent application Ser. No. 15/838,733, filed Dec. 12, 2107, both of which are assigned to the same assignee as the current application; both are herein incorporated into this application by reference with the same force and effect as if set forth herein.

Thus, according to embodiments, a phishing testing campaign is conducted in which phishing attacks are directed against network nodes, and then it is detected which users fell prey to the attack (e.g. made a forbidden selection of a phishing link). The detection is achieved by locally detecting events within the relevant network nodes, which events are caused by the success of the attack, without moving the detection responsibility to a remote server.

Figure 3:
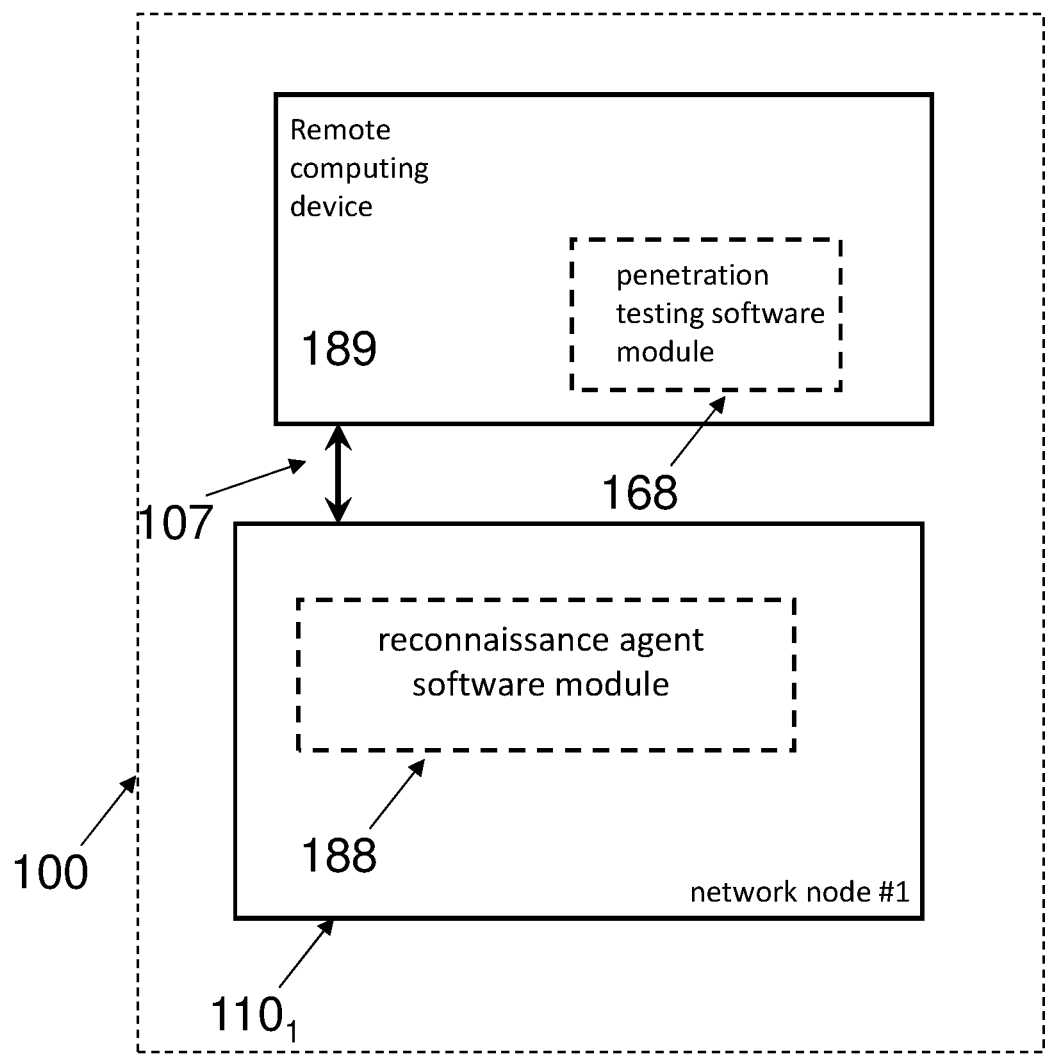
FIGS. 3 and 4 are schematic block diagrams of penetration testing systems according to some embodiments.

Referring again to the figures, FIG. 3 illustrates an embodiment of a penetration testing system 100 comprising a penetration testing software module 168 and a reconnaissance agent software module 188. The reconnaissance agent software module 188 is installed on the network node $110_1$. The penetration testing software module 168 is installed on the remote computing device 189. In this non-limiting example, network node $110_1$ is in electronic communication with the remote computing device 189 via connection 107. Connection 107 can comprise any of the wired or wireless connection methods known, and remote computing device 189 can be part of the networked systems of nodes 110 or can be external to the network and configured to access the network nodes through the Internet, through a virtual private network, through a physical connection or using any other suitable way. Additional network nodes 110 of a networked system can be connected to the remote computing device 189 in the same manner of network node $110_1$ (NOT SHOWN).

Figure 4:
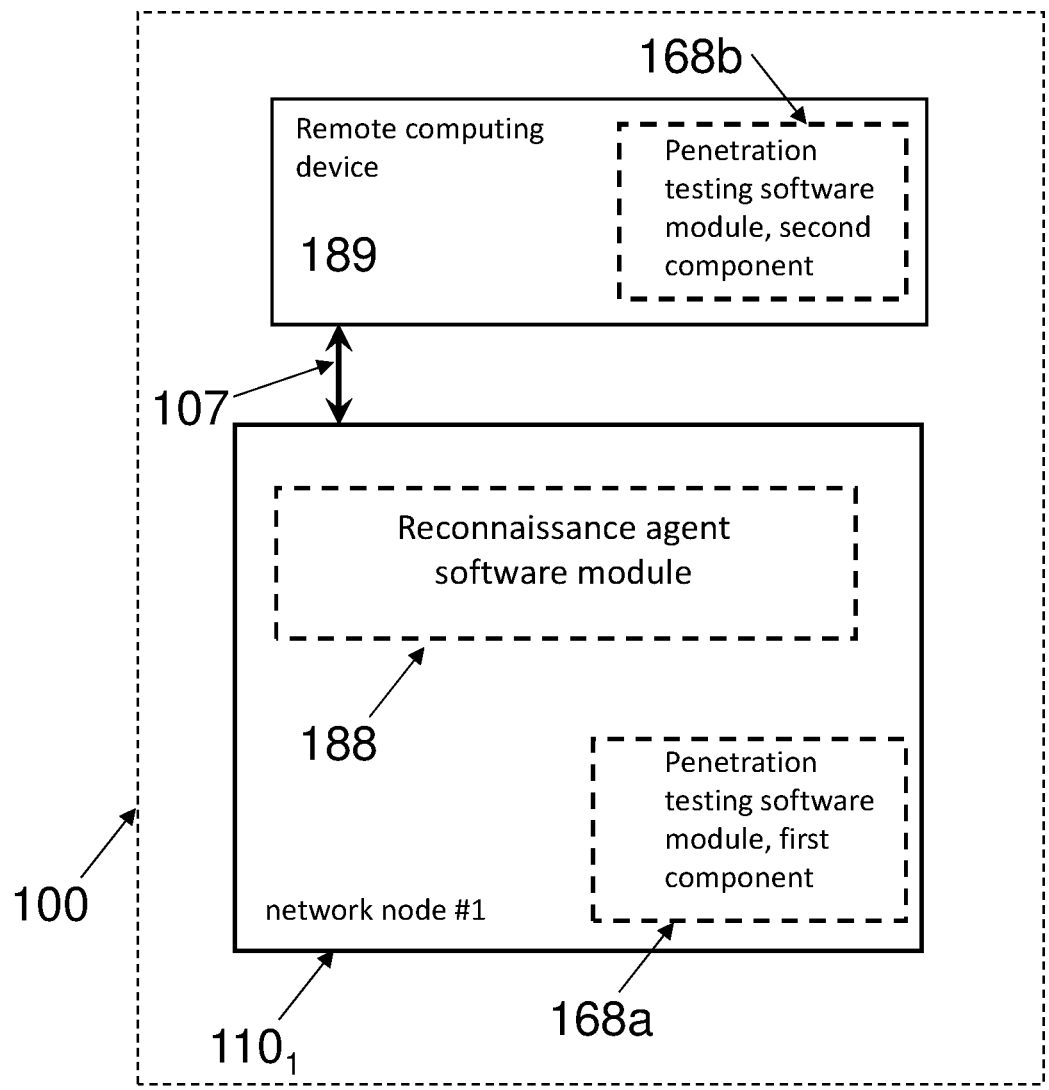
Figure 5:
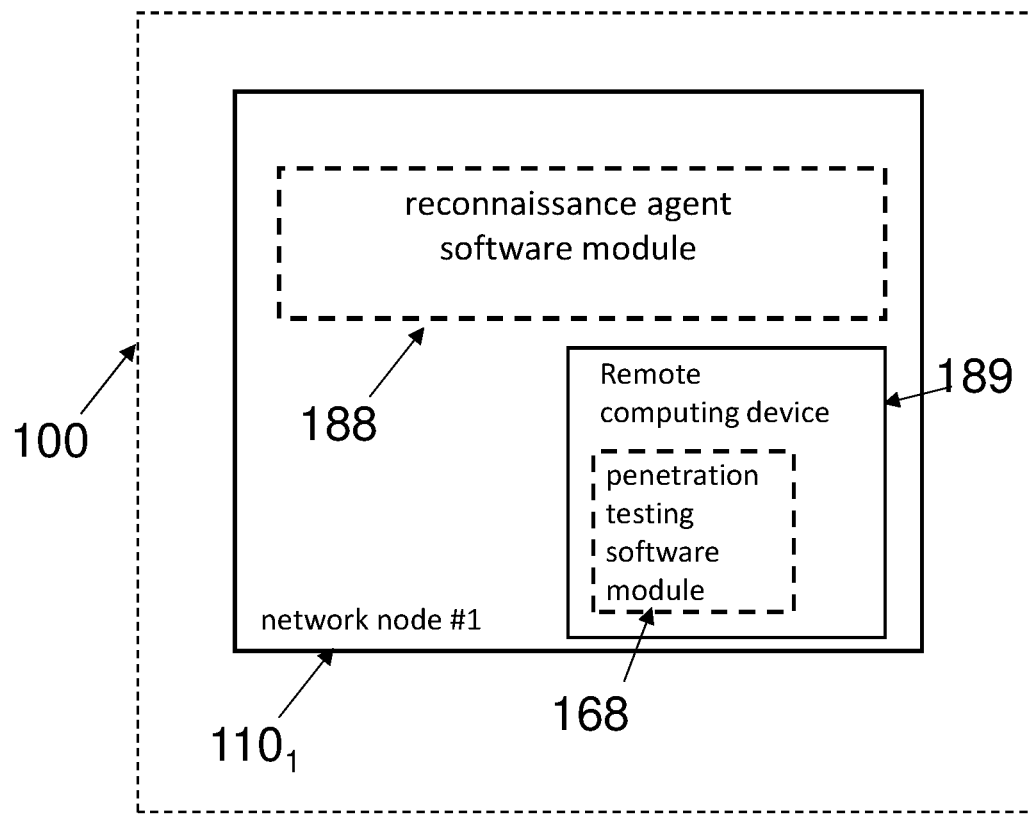
FIG. 5 is a schematic block diagram of a network node in accordance with some embodiments.

Two alternative embodiments of a penetration testing system 100 are illustrated in FIGS. 4 and 5, and they are distinguished from the embodiment of FIG. 3 as follows: In an alternative example illustrated in FIG. 4, a penetration testing software module resides on multiple computing devices. A first component 168a of the penetration testing software module resides on the network node $110_1$, and a second component 168b of the penetration testing software module resides on the remote computing device 189. In a second alternative example illustrated in FIG. 5, the penetration testing software module 168 is installed on the remote computing device 189, which in turn is not a physically remote machine but rather a virtual machine running inside a physical computing device, in this example network node $110_1$, on top of the hosting operating system of the network node $110_1$. All other features of the respective embodiments of FIGS. 4 and 5 are the same as for FIG. 3.

A number of methods embodying various aspects of the present invention are disclosed herein; in some embodiments, not all steps disclosed for a particular method are necessary, and some or all of the steps of any particular method can be combined with other methods and/or steps from other methods.

Figure 6:
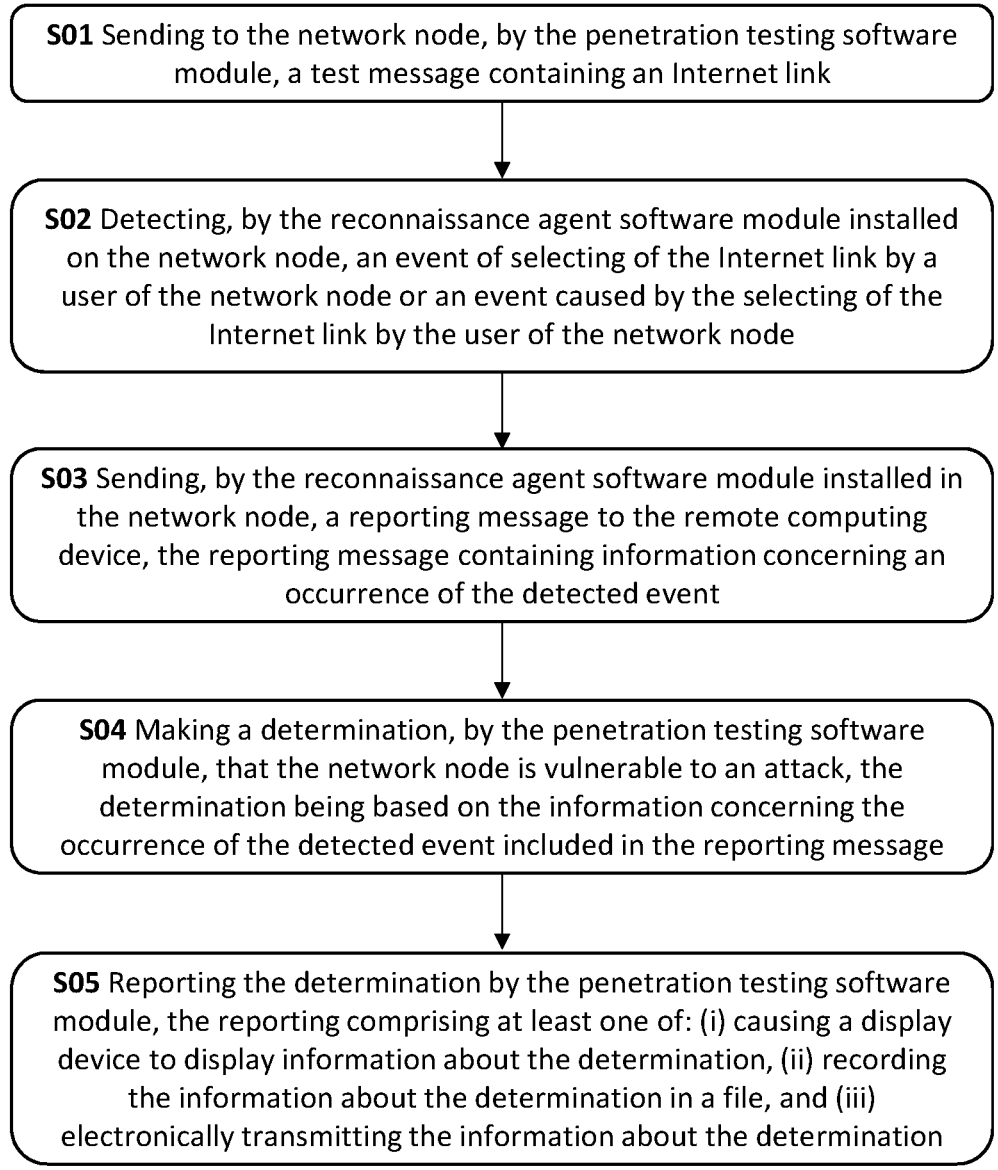
FIGS. 6 through 11 are flow charts of methods for testing a network node by a penetration testing system, according to various embodiments.

Referring now to FIG. 6, a method is disclosed for testing a network node by a penetration testing system such as any of the penetration testing systems 100 disclosed herein, for the purpose of dealing with attacks using phishing messages. A penetration testing system 100 suitable for practicing the method comprises (A) a reconnaissance agent software module installed in the network node, wherein the reconnaissance agent software module is operable, when installed in the network node, to do at least (i) detect at least one type of events occurring in the network node, and (ii) transmit data about the detected events out of the network node, and (B) a penetration testing software module installed on a remote computing device, wherein the remote computing device is operable at least to (i) communicate with the network node on which the reconnaissance agent software module is installed, and (ii) receive the data transmitted out of the network node. The method comprises the following steps:

a. Step S01 sending to the network node, by the penetration testing software module, a test message containing an Internet link. According to various embodiments, the test message may be an email message, an SMS message, a social network message, or a chat message. The Internet link may be contained in a body of the test message. Alternatively, the Internet link may be contained in a file attached to the test message. In embodiments, the Internet link can be to an Internet address that is inactive or invalid.

b. Step S02 detecting, by the reconnaissance agent software module installed on the network node, an event of selecting of the Internet link by a user of the network node or an event caused by the selecting of the Internet link by the user of the network node.

c. Step S03 sending, by the reconnaissance agent software module installed on the network node, a reporting message to the remote computing device, the reporting message containing information concerning an occurrence of the detected event;

d. Step S04 making a determination, by the penetration testing software module, that the network node is vulnerable to a phishing attack, the determination being based on the information concerning the occurrence of the detected event included in the reporting message;

e. Step S05 reporting the determination by the penetration testing software module, the reporting comprising at least one of: (i) causing a display device to display information about the determination, (ii) recording the information about the determination in a file, and (iii) electronically transmitting the information about the determination.

Figure 7:
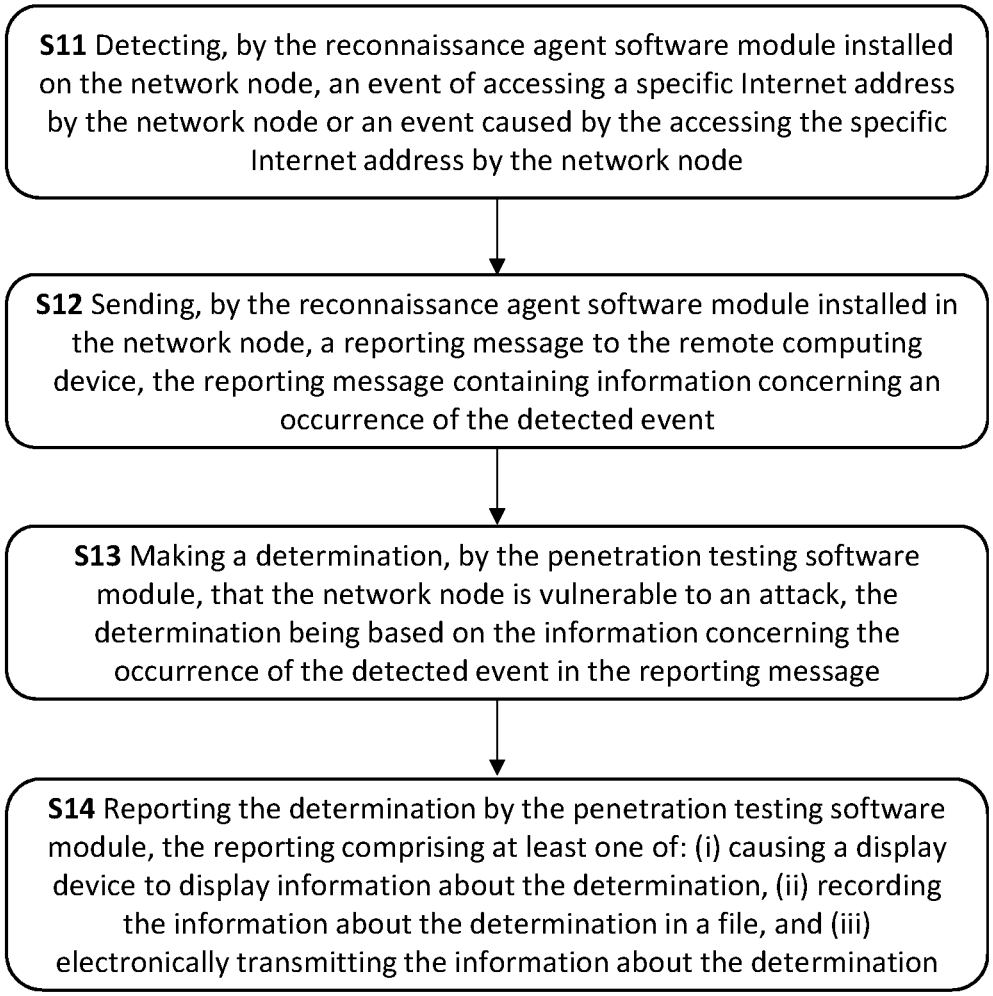

Referring now to FIG. 7, a method is disclosed for testing a network node by a penetration testing system such as any of the penetration testing systems 100 disclosed herein, for the purpose of dealing with attacks based on tempting a user to access a malicious website. A penetration testing system suitable for practicing the method comprises (A) a reconnaissance agent software module installed in the network node, wherein the reconnaissance agent software module is operable, when installed in the network node, to do at least (i) detect at least one type of event occurring in the network node, and (ii) transmit data about the detected events out of the network node, and (B) a penetration testing software module installed on a remote computing device, wherein the remote computing device is operable at least to (i) communicate with the network node on which the reconnaissance agent software module is installed, and (ii) receive the data transmitted out of the network node. The method comprises the following steps:

a. Step S11 detecting, by the reconnaissance agent software module installed on the network node, an event of accessing a specific Internet address by the network node or an event caused by the accessing the specific Internet address by the network node. In some embodiments, accessing the specific Internet address may include manually typing the specific Internet address into an Internet browser by a user of the network node.

b. Step S12 sending, by the reconnaissance agent software module installed on the network node, a reporting message to the remote computing device, the reporting message containing information concerning an occurrence of the detected event.

c. Step S13 making a determination, by the penetration testing software module, that the network node is vulnerable to an attack, the determination being based on the reporting message.

d. Step S14 reporting the determination by the penetration testing software module, the reporting comprising at least one of: (i) causing a display device to display information about the determination, (ii) recording the information about the determination in a file, and (iii) electronically transmitting the information about the determination.

Figure 8:
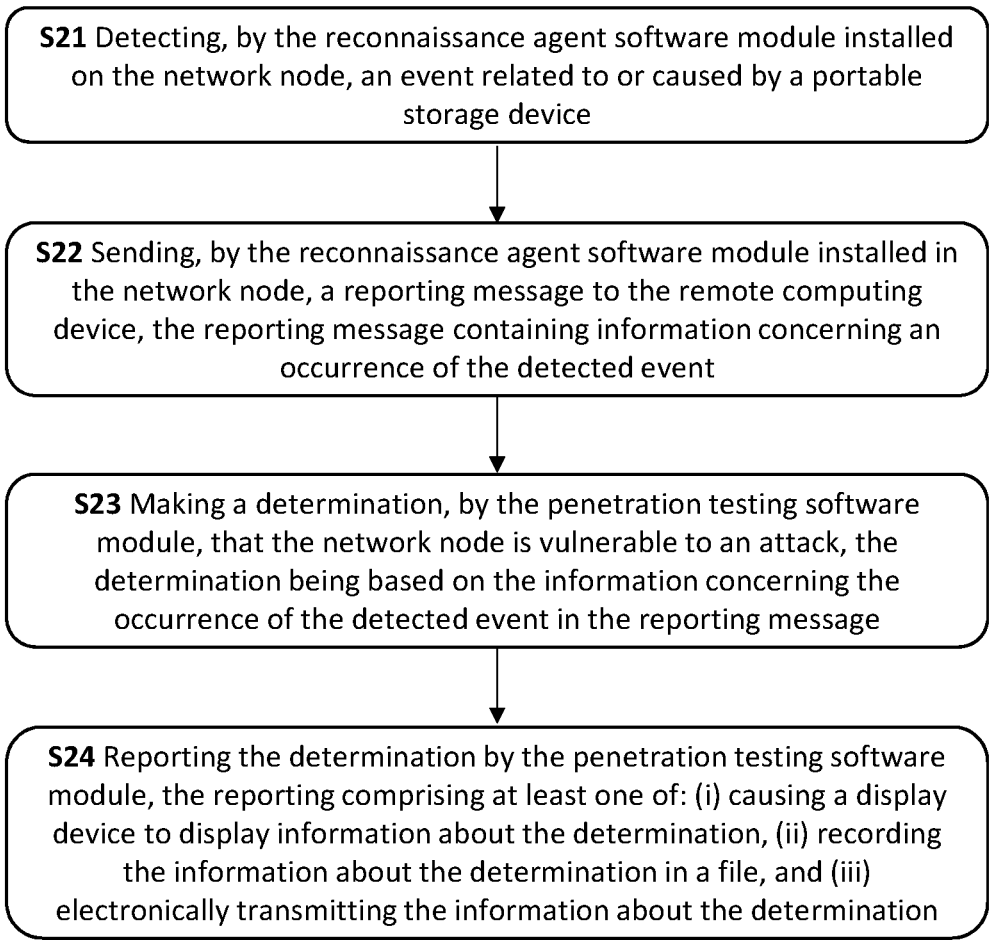

Referring now to FIG. 8, a method is disclosed for testing a network node by a penetration testing system such as any of the penetration testing systems 100 disclosed herein, for the purpose of dealing with attacks based on tempting a user to insert a malicious portable storage device into the user's computing device. A penetration testing system suitable for the practicing the method comprises (A) a reconnaissance agent software module installed in the network node, wherein the reconnaissance agent software module is operable, when installed in the network node, to do at least (i) detect at least one type of events occurring in the network node, and (ii) transmit data about the detected events out of the network node, and (B) a penetration testing software module installed on a remote computing device, wherein the remote computing device is operable at least to (i) communicate with the network node on which the reconnaissance agent software module is installed, and (ii) receive the data transmitted out of the network node. The method comprises the following steps:

a. Step S21 detecting, by the reconnaissance agent software module installed on the network node, an event related to or caused by a portable storage device.

b. Step S22 sending, by the reconnaissance agent software module installed on the network node, a reporting message to the remote computing device, the reporting message containing information concerning an occurrence of the detected event.

c. Step S23 making a determination, by the penetration testing software module, that the network node is vulnerable to an attack, the determination being based on the reporting message.

d. Step S24 reporting the determination by the penetration testing software module, the reporting comprising at least one of: (i) causing a display device to display information about the determination, (ii) recording the information about the determination in a file, and (iii) electronically transmitting the information about the determination.

In some embodiments, Step S21 may comprise detecting that the portable storage device is being inserted into the network node, and detecting that the portable storage device has a specific characteristic, such as, for example an identification number of the portable storage device, a volume name of the portable storage device, or having a file with a specific name residing in the portable storage device. These are only a few examples of specific characteristics of portable storage devices, and when implementing the method, many specific characteristics may be relevant, including more than one at a time.

In some embodiments, Step S21 may comprise detecting that the portable storage device has a specific characteristic and detecting that a file having a specific name that resides on the portable storage device is opened or executed.

Figure 9:
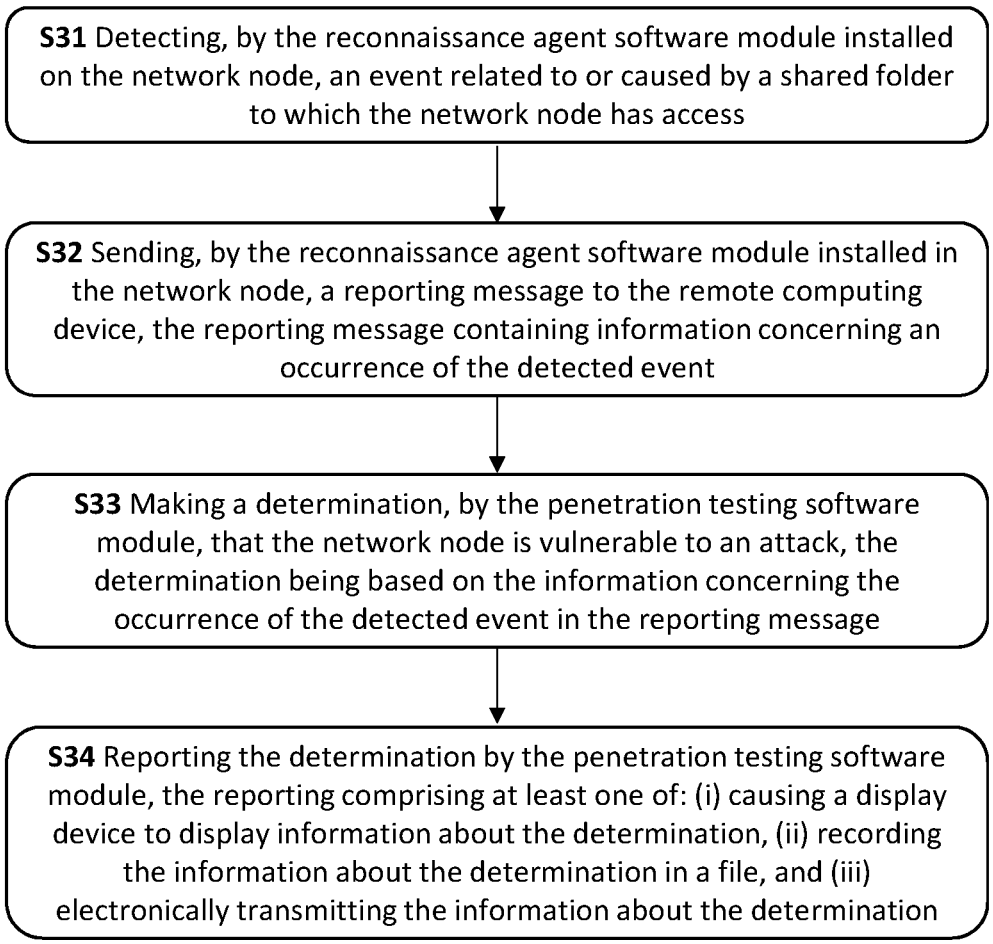

Referring now to FIG. 9, a method is disclosed for testing a network node by a penetration testing system such as any of the penetration testing systems 100 disclosed herein, for the purpose of dealing with attacks based on inserting a malicious file into a shared folder. A penetration testing system suitable for practicing the method comprises (A) a reconnaissance agent software module installed in the network node, wherein the reconnaissance agent software module is operable, when installed in the network node, to do at least (i) detect at least one type of events occurring in the network node, and (ii) transmit data about the detected events out of the network node, and (B) a penetration testing software module installed on a remote computing device, wherein the remote computing device is operable at least to (i) communicate with the network node on which the reconnaissance agent software module is installed, and (ii) receive the data transmitted out of the network node. The method comprises the following steps:

a. Step S31 detecting, by the reconnaissance agent software module installed on the network node, an event related to or caused by a shared folder to which the network node has access.

b. Step S32 sending, by the reconnaissance agent software module installed on the network node, a reporting message to the remote computing device, the reporting message containing information concerning an occurrence of the detected event.

c. Step S33 making a determination, by the penetration testing software module, that the network node is vulnerable to an attack, the determination being based on the reporting message.

d. Step S34 reporting the determination by the penetration testing software module, the reporting comprising at least one of: (i) causing a display device to display information about the determination, (ii) recording the information about the determination in a file, and (iii) electronically transmitting the information about the determination.

In some embodiments, Step S31 may comprise detecting that a file having a specific name is retrieved from the shared folder and is opened or executed. In some embodiments, Step S31 may comprise detecting that a file having a specific name is retrieved from the shared folder and detecting that a link contained in the file is being selected.

Figure 10:
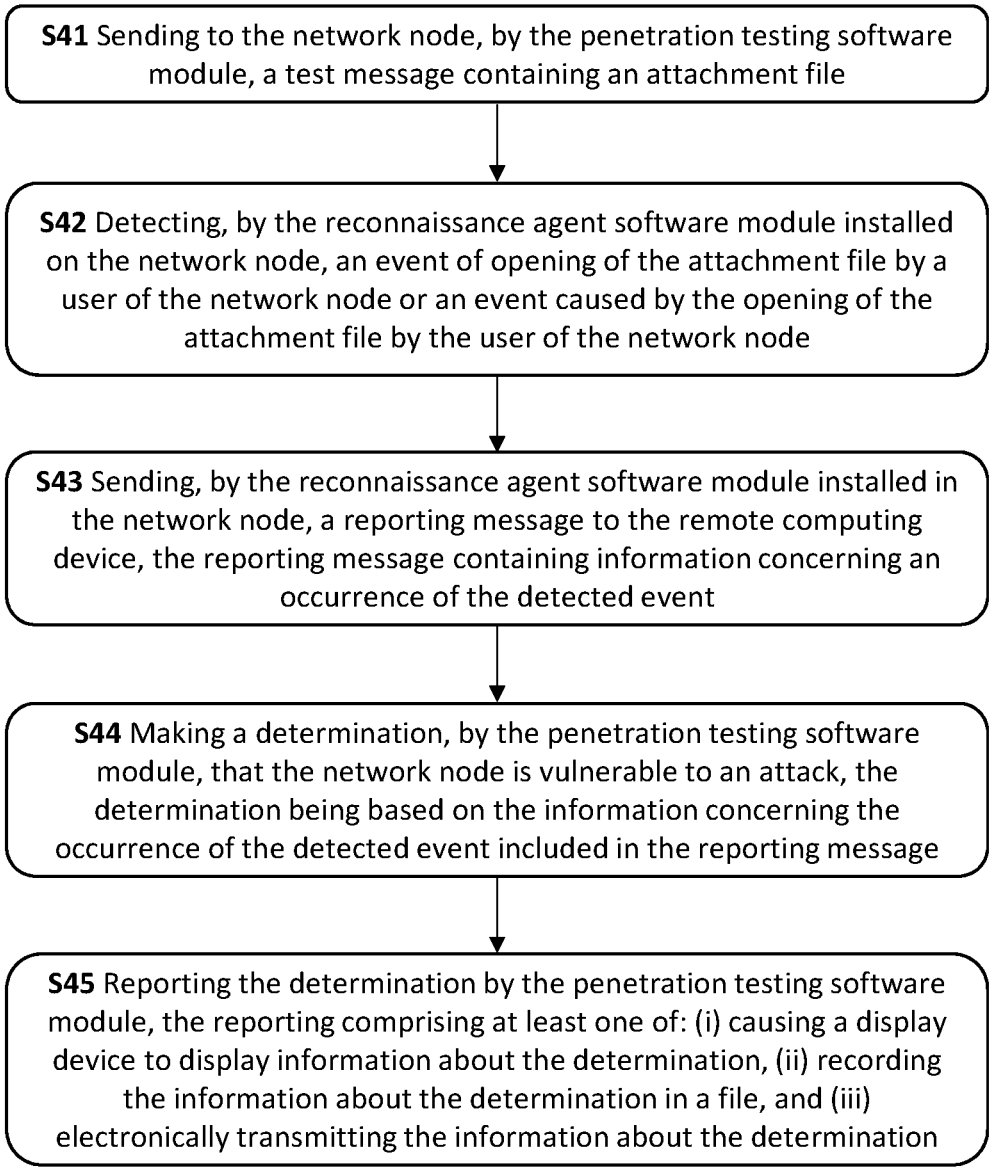

Referring now to FIG. 10, a method is disclosed for testing a network node by a penetration testing system such as any of the penetration testing systems 100 disclosed herein, for the purpose of dealing with attacks based on attaching a file containing a malicious auto-executing macro to a message. A penetration testing system suitable for practicing the method comprises (A) a reconnaissance agent software module installed in the network node, wherein the reconnaissance agent software module is operable, when installed in the network node, to do at least (i) detect at least one type of events occurring in the network node, and (ii) transmit data about the detected events out of the network node, and (B) a penetration testing software module installed on a remote computing device, wherein the remote computing device is operable at least to (i) communicate with the network node on which the reconnaissance agent software module is installed, and (ii) receive the data transmitted out of the network node. The method comprises the following steps:

a. Step S41 sending to the network node, by the penetration testing software module, a test message containing an attachment file;

b. Step S42 detecting, by the reconnaissance agent software module installed on the network node, an event of opening of the attachment file by a user of the network node or an event caused by the opening of the attachment file by the user of the network node;

c. Step S43 sending, by the reconnaissance agent software module installed on the network node, a reporting message to the remote computing device, the reporting message containing information concerning an occurrence of the detected event;

d. Step S44 making a determination, by the penetration testing software module, that the network node is vulnerable to an attack, the determination being based on the information concerning the occurrence of the detected event included in the reporting message;

e. Step S45 reporting the determination by the penetration testing software module, the reporting comprising at least one of: (i) causing a display device to display information about the determination, (ii) recording the information about the determination in a file, and (iii) electronically transmitting the information about the determination.

In some embodiments, Step S42 may comprise detecting that the attachment file has a specific name and is opened or executed. In some embodiments, Step S42 may comprise detecting that the attachment file has a specific name and detecting that a link contained in the attachment file is being selected.

For all the above methods discussed with reference to FIGS. 6 through 10, a detected event, for example any of the events detected in Steps S02, S11, S21, S31 or S42, may be caused by a 'previous event' that corresponds to an operation the user should have better avoided—selecting of a link by a user of the network node, accessing of a specific Internet address by the network node, inserting of a portable storage device into the network node, opening or executing of a file residing on a portable storage device, opening or executing a file retrieved from a shared folder, selecting of a link in a file retrieved from a shared folder, etc. Subsequent to one of these 'previous events', a message may be sent by the network node, a specific executable file may be executed by the network node, and/or there can be a registry-related or filed-related operation done in the network node.

In such cases: the detecting of an event as in, for example, any of Steps S02, S11, S21, S31 or S42, may comprise detecting a message sent by the network node and having a specific characteristic. The specific characteristic of the message may include a specific characteristic of the content of the message. The specific characteristic of the message may include a specific characteristic of the address to which the message is being sent. The specific characteristic of the address may be that the address is a specific address.

The message sent by the network node may be an email message and the specific characteristic of the address may be that a domain name of the address is a specific domain name. The message sent by the network node may be an email message and the specific characteristic of the address may be that the address is a loopback address.

Additionally or alternatively, the detecting of an event as in, for example, any of Steps S02, S11, S21, S31 or S42, may comprise detecting an execution of a specific executable file by the network node. The sending of the reporting message to the remote computing device may be caused by code of the specific executable file. Alternatively, the sending of the reporting message to the remote computing device may be caused by code of the reconnaissance agent software module that is not code of the specific executable file.

Additionally or alternatively, the detecting of an event as in, for example, any of Steps S02, S11, S21, S31 or S42, may comprise detecting a specific registry-related operation. The specific registry-related operation may include writing into a specific registry key. The specific registry-related operation may include writing a specific value into a specific registry key.

Additionally or alternatively, the detecting of an event as in, for example, any of Steps S02, S11, S21, S31 or S42, may comprise detecting a specific file-related operation. The specific file-related operation may include a creation of a new file inside a specific folder. The specific file-related operation may include a writing operation into a specific file. The specific file-related operation may include a reading operation from a specific file.

Figure 11:
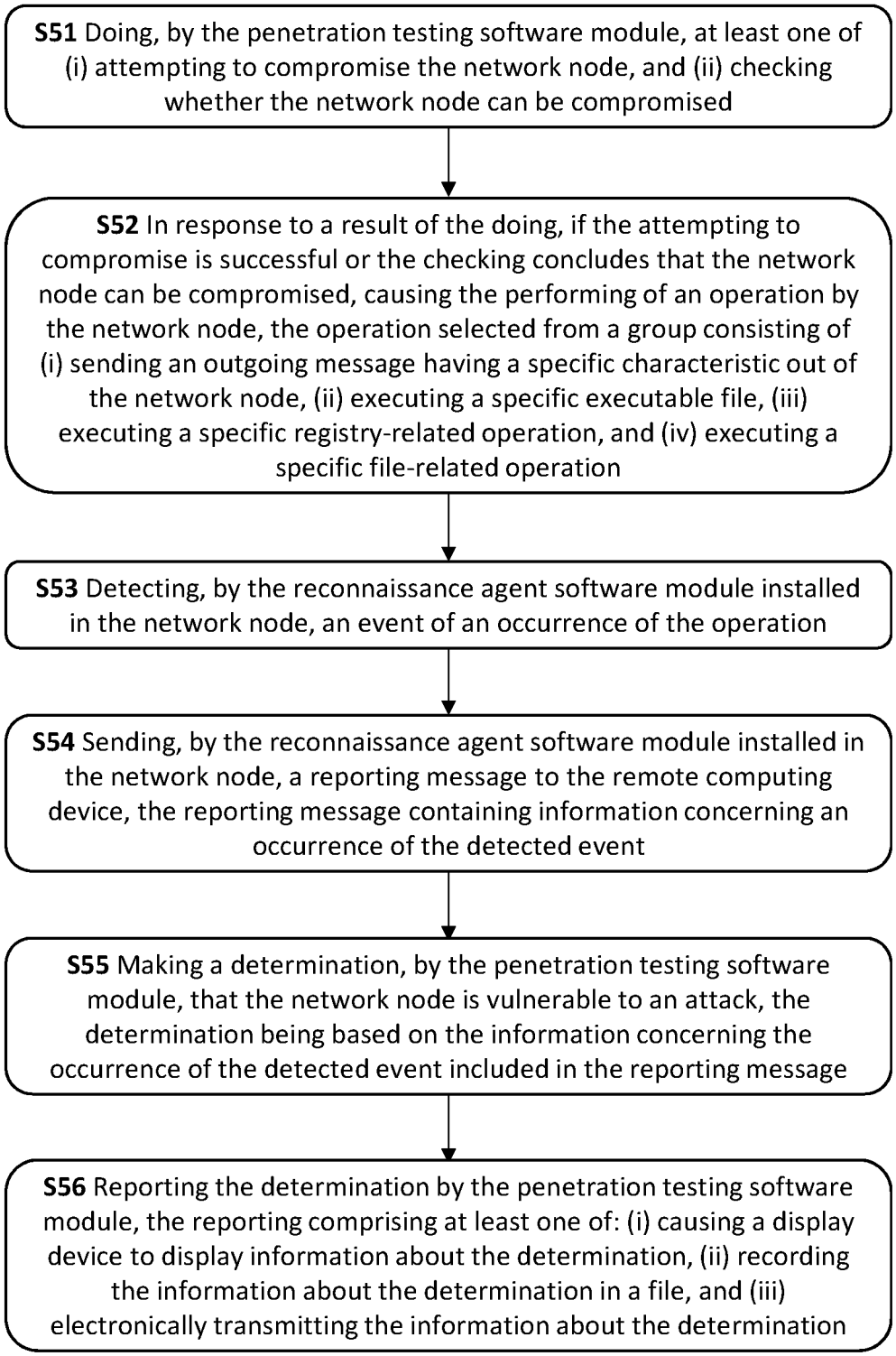

Referring now to FIG. 11, a method is disclosed for testing a network node by a penetration testing system such as any of the penetration testing systems 100 disclosed herein, for detecting a success of an attack against the network node conducted by the penetration testing system. A penetration testing system suitable for practicing the method comprises (A) a reconnaissance agent software module installed in the network node, wherein the reconnaissance agent software module is operable, when installed in the network node, to do at least (i) detect at least one type of events occurring in the network node, and (ii)) transmit data about the detected events out of the network node, and (B) a penetration testing software module installed on a remote computing device, wherein the remote computing device is operable at least to (i) communicate with the network node on which the reconnaissance agent software module is installed, and (ii) receive the data transmitted out of the network node, the method comprising:

a. Step S51 doing, by the penetration testing software module, at least one of (i) attempting to compromise the network node, and (ii) checking whether the network node could be compromised.

b. Step S52 in response to a result of the doing, if the attempting to compromise is successful or the checking concludes that the network node can be compromised, causing the performing of an operation by the network node, the operation selected from a group consisting of (i) sending a message having a specific characteristic out of the network node, (ii) executing a specific executable file, (iii) executing a specific registry-related operation, and (iv) executing a specific file-related operation.

c. Step S53 detecting, by the reconnaissance agent software module installed in the network node, an event of an occurrence of the operation.

d. Step S54 sending, by the reconnaissance agent software module installed on the network node, a reporting message to the remote computing device, the reporting message containing information concerning an occurrence of the operation.

e. Step S55 determining, by the penetration testing software module, that the network node is vulnerable to an attack, the determining being based on information concerning an occurrence of the detected event in the reporting message.

f. Step S56 reporting the determination by the penetration testing software module, the reporting comprising at least one of: (i) causing a display device to display information about the determination, (ii) recording the information about the determination in a file, and (iii) electronically transmitting the information about the determination.

In some embodiments, the operation of Step S52 may be the sending of a message having a specific characteristic out of the network node. The specific characteristic of the message may include a specific characteristic of the content of the message. The specific characteristic of the message may include a specific characteristic of the address to which the message is being sent. The specific characteristic of the address may be that the address is a specific address. The message may be an email message and the specific characteristic of the address may be that a domain name of the address is a specific domain name. The message may be an email message and the specific characteristic of the address may be that the address is a loopback address.

Additionally or alternatively, the operation of Step S52 may be the executing of a specific executable file. The sending of the reporting message to the remote computing device may be caused by code of the specific executable file. The sending of the reporting message to the remote computing device may be caused by code of the reconnaissance agent software module that is not code of the specific executable file.

Additionally or alternatively, the operation of Step S52 may be the executing of a specific registry-related operation. The specific registry-related operation may include writing into a specific registry key. The specific registry-related operation may include writing a specific value into a specific registry key.

Additionally or alternatively, the operation of Step S52 may be the executing of a specific file-related operation. The specific file-related operation may include a creation of a new file inside a specific folder. The specific file-related operation may include a writing operation into a specific file. The specific file-related operation may include a reading operation from a specific file.

In some embodiments, Step S51 may include sending to the network node a message containing an Internet link. Additionally or alternatively, Step S51 may include causing the network node to access a specific Internet address. Additionally or alternatively, Step S51 may include the use of a portable storage device. Additionally or alternatively, Step S51 may include the use of a shared folder to which the network node has access. Additionally or alternatively, Step S51 may include sending to the network node a message containing an attachment file.

Figure 12A:
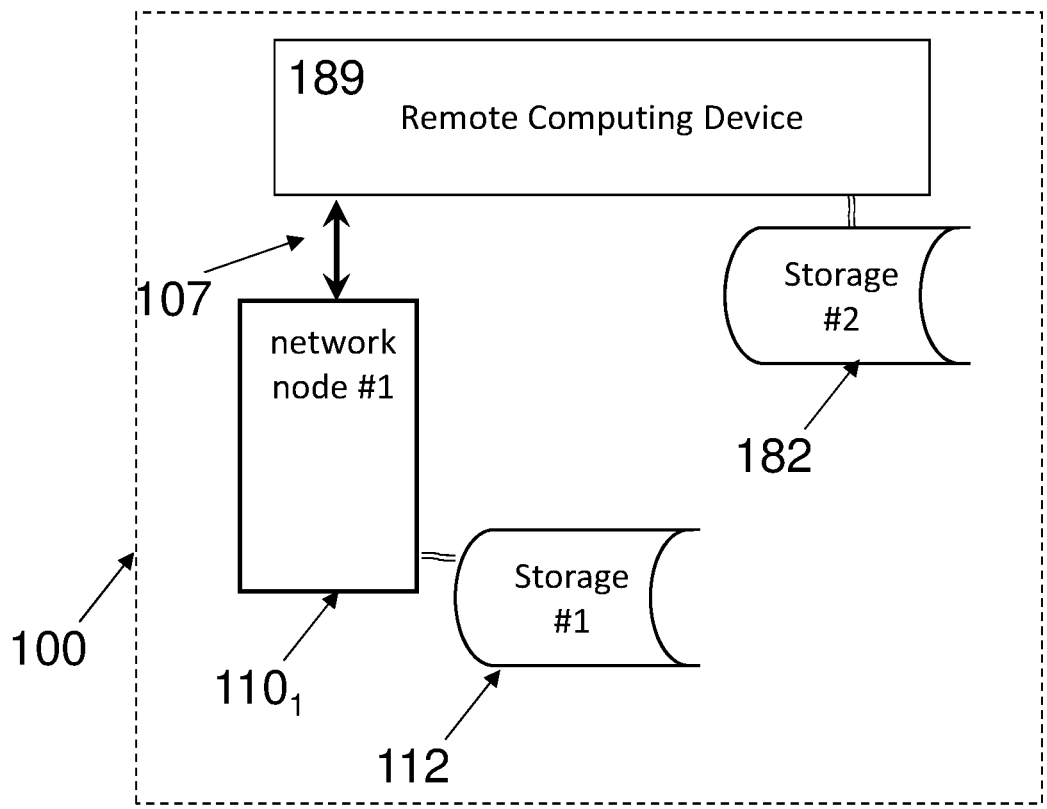
FIGS. 12A and 12B are schematic block diagrams of penetration testing systems according to some embodiments.

FIG. 12A shows an illustrative penetration testing system 100 for testing a network node $110_1$. The penetration testing system 100 comprises a remote computing device 189, first non-transitory computer-readable storage medium 112 and second non-transitory computer-readable storage medium 182, the first and second non-transitory computer-readable storage media 112, 182 containing first and second program instructions, respectively. Examples of non-transitory computer-readable storage media known in the art include magnetic, optical and solid-state storage media. In the non-limiting example of FIG. 12A, the first storage medium 112 is included in or physically connected to network node $110_1$, and the second storage medium 181 is included in or physically connected to the remote computing device 189. The subscript in $110_1$ indicates, as was the case with network nodes 110 in FIG. 2, that this is network node #1 out of a plurality of network nodes in a networked system (NOT SHOWN). Network node $110_1$ is preferably in electronic communication with the remote computing device 189, via connection 107. Connection 107 can comprise any of the wired or wireless connection methods known, and remote computing device 189 can be part of the networked system of nodes 110 or can be external to the networked system and configured to access the network nodes through the Internet, through a virtual private network, through a physical connection or using any other suitable way. Additional network nodes 110 of the networked system can be connected to the remote computing device 189 in the same manner of network node $110_1$ (NOT SHOWN).

Figure 12B:
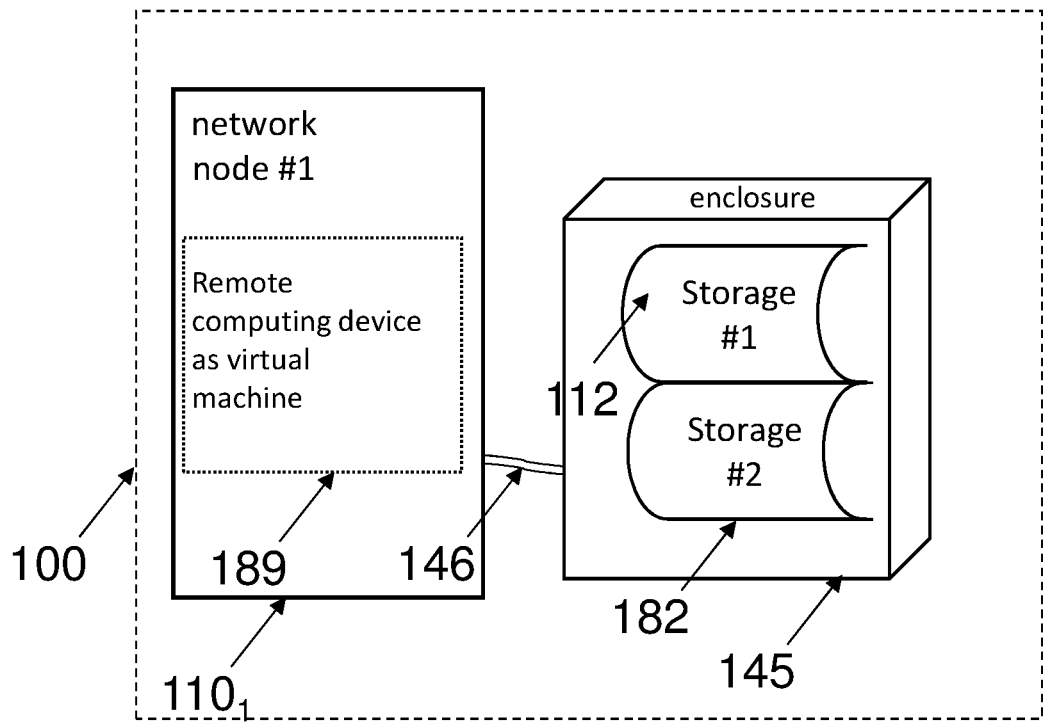

FIG. 12B illustrates an alternative embodiment of a penetration testing system 100 for testing a network node $110_1$ in which a penetration testing software module is executed in the targeted network node $110_1$, in remote computing device 189, which in this example is not a physically remote machine but rather a virtual machine installed in the network node $110_1$ and operating on top of the hosting operating system of the network node $110_1$. The penetration testing system 100 comprises, in addition to the remote computing device 189, first non-transitory computer-readable storage medium 112 and second non-transitory computer-readable storage medium 182. In this alternative embodiment, first and second non-transitory computer-readable storage media 112, 182 are both located in the same physical location and/or, in some embodiments, are both located in the same physical enclosure 145, and/or, in some embodiments, are the same non-transitory computer-readable storage medium. In the non-limiting example of FIG. 12B, there is shown an electronic communication channel 146 between first and second non-transitory computer-readable storage media 112, 182 and network node $110_1$, but in another example (NOT SHOWN) the enclosure 145 can be physically installed within network node $110_1$. Depending on the location, the electronic communication can be by wired or wireless means, and may or may not be part of a larger network.

In some embodiments, a penetration testing system 100 of either of FIG. 12A or 12B for testing a network node $110_1$ on which a reconnaissance agent software module is installed, comprises a remote computing device 189, first non-transitory computer-readable storage medium 112 and second non-transitory computer-readable storage medium 182. A penetration testing software module of the penetration testing system is installed on the remote computing device. The remote computing device 189 is in electronic communication with network node $110_1$, via connection 107, which can comprise any of the wired or wireless connection methods known.

Figure 13:
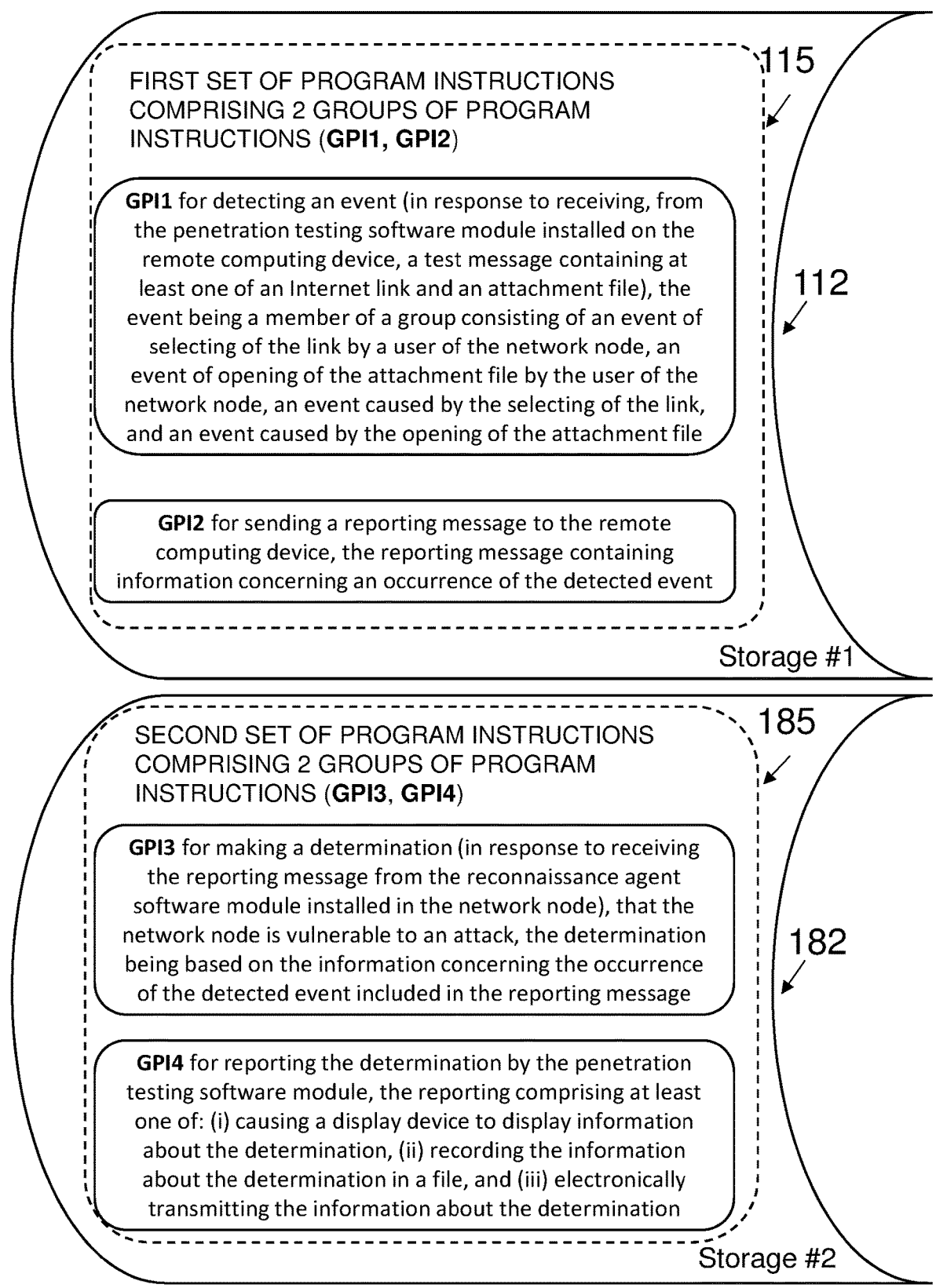
FIGS. 13 and 14 show schematic representations of computer-readable storage media and groups of program instructions stored thereon, according to some embodiments.

Referring now to FIG. 13, first non-transitory computer-readable storage medium 112 contains first program instructions 115, wherein execution of the first program instructions 115 by one or more processors of the network node $110_1$ causes the one or more processors of the network node $110_1$ to carry out portions of a method of penetration testing of a network node by a penetration testing system. The first program instructions 115 comprise two groups of program instructions GPI1, GPI2, where each group of program instructions GPI1, GPI2 includes the program instructions for carrying out one portion of the method, the two groups comprising:

a. Group of program instructions GPI1 including program instructions for detecting an event (in response to receiving, from the penetration testing software module installed on the remote computing device, a test message containing at least one of an Internet link and an attachment file), the event being a member of a group consisting of an event of selecting of the link by a user of the network node, an event of opening of the attachment file by the user of the network node, an event caused by the selecting of the link, and an event caused by the opening of the attachment file. The detecting is carried out by the reconnaissance agent software module installed in the network node $110_1$.

b. Group of program instructions GPI2 including program instructions for sending a reporting message to the remote computing device, the reporting message containing information concerning an occurrence of the detected event. The sending is carried out by the reconnaissance agent software module installed in the network node $110_1$.

Second non-transitory computer-readable storage medium 182 contains second program instructions 185, wherein execution of the second program instructions 185 by one or more processors of the remote computing device 189 causes the one or more processors of the remote computing device 189 to carry out portions of a method of penetration testing of a network node by a penetration testing system. The second program instructions 185 comprise two groups of program instructions GPI3, GPI4, where each group of program instructions GPI3, GPI4 includes the program instructions for carrying out a one portion of the method, the two groups comprising:

c. Group of program instructions GPI3 including program instructions for making a determination (in response to receiving the reporting message from the reconnaissance agent software module installed in the network node), that the network node is vulnerable to an attack, the determination being based on the information concerning the occurrence of the detected event included in the reporting message. The determination is made by the penetration testing software module 168.

d. Group of program instructions GPI4 including program instructions for reporting the determination by the penetration testing software module, the reporting comprising at least one of: (i) causing a display device to display information about the determination, (ii) recording the information about the determination in a file, and (iii) electronically transmitting the information about the determination.

In some embodiments, the first non-transitory computer-readable storage medium 112 is installed at the network node $110_1$ and the second non-transitory computer-readable storage medium 182 is installed at the remote computing device 189. In some embodiments, the first and second non-transitory computer-readable storage media 112, 182 are either the same non-transitory computer-readable storage medium or are both located in a common physical enclosure.

It will be obvious to the skilled practitioner that any of the features associated with embodiments of the methods illustrated in FIG. 6 or 10 and disclosed in the earlier discussion with respect to those embodiments will be equally applicable to the analogous program instruction groups disclosed in FIG. 13 and the accompanying discussion.

Figure 14:
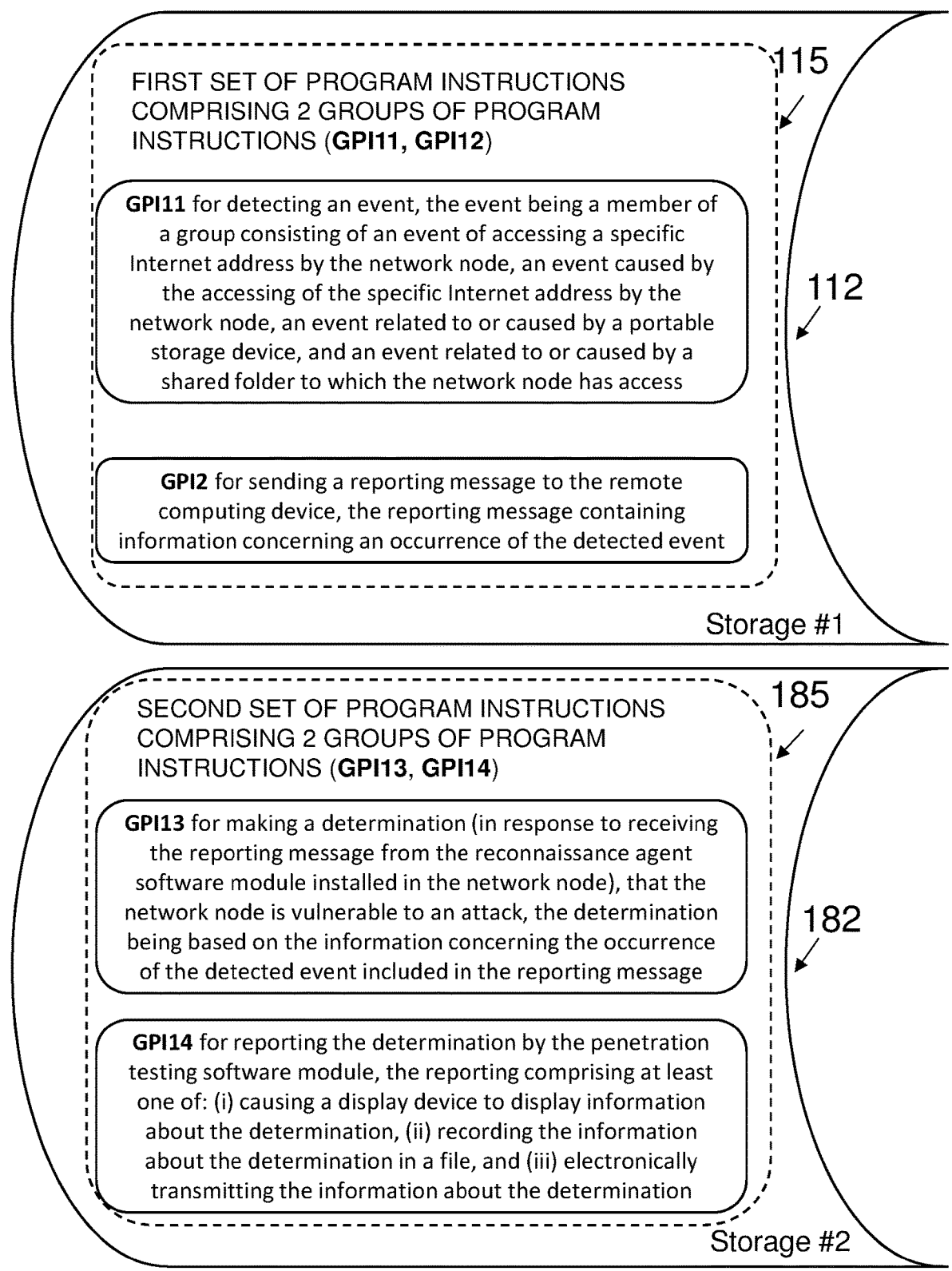

Referring now to FIG. 14, first non-transitory computer-readable storage medium 112 contains first program instructions 115, wherein execution of the first program instructions 115 by one or more processors of the network node $110_1$ causes the one or more processors of the network node $110_1$ to carry out portions of a method of penetration testing of a network node by a penetration testing system. The first program instructions 115 comprise two groups of program instructions GPI11, GPI12, where each group of program instructions GPI11, GPI12 includes the program instructions for carrying out one portion of the method, the two groups comprising:

a. Group of program instructions GPI11 including program instructions for detecting an event, the event being a member of a group consisting of an event of accessing a specific Internet address by the network node, an event caused by the accessing of the specific Internet address by the network node, an event related to or caused by a portable storage device, and an event related to or caused by a shared folder to which the network node has access. The detecting is carried out by the reconnaissance agent software module installed in the network node $110_1$.

b. Group of program instructions GPI12 including program instructions for sending a reporting message to the remote computing device, the reporting message containing information concerning an occurrence of the detected event. The sending is carried out by the reconnaissance agent software module installed in the network node $110_1$.

Second non-transitory computer-readable storage medium 182 contains second program instructions 185, wherein execution of the second program instructions 185 by one or more processors of the remote computing device 189 causes the one or more processors of the remote computing device 189 to carry out portions of a method of penetration testing of a network node by a penetration testing system. The second program instructions 185 comprise two groups of program instructions GPI13, GPI14, where each group of program instructions GPI13, GPI14 includes the program instructions for carrying out one portion of the method, the two groups comprising:

a. Group of program instructions GPI13 including program instructions for making a determination (in response to receiving the reporting message from the reconnaissance agent software module installed in the network node), that the network node is vulnerable to an attack, the determination being based on the information concerning the occurrence of the detected event included in the reporting message. The determination is made by the penetration testing software module 168.

b. Group of program instructions GPI14 including program instructions for reporting the determination by the penetration testing software module, the reporting comprising at least one of: (i) causing a display device to display information about the determination, (ii) recording the information about the determination in a file, and (iii) electronically transmitting the information about the determination.

In some embodiments, the first non-transitory computer-readable storage medium 112 is installed at the network node $110_1$ and the second non-transitory computer-readable storage medium 182 is installed at the remote computing device 189. In some embodiments, the first and second non-transitory computer-readable storage media 112, 182 are either the same non-transitory computer-readable storage medium or are both located in a common physical enclosure.

It will be obvious to the skilled practitioner that any of the features associated with embodiments of the methods illustrated in FIGS. 7-9 and disclosed in the earlier discussion with respect to those embodiments will be equally applicable to the analogous program instruction groups disclosed in FIG. 14 and the accompanying discussion.

Figure 15A:
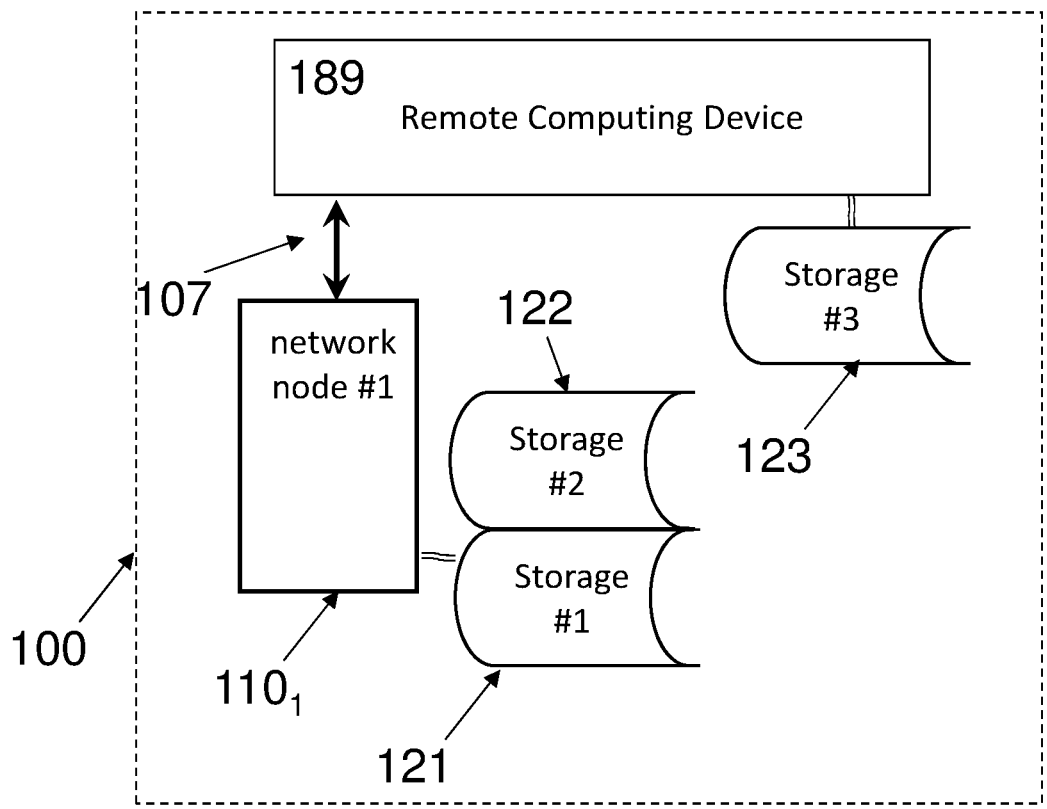
FIGS. 15A and 15B are schematic block diagrams of penetration testing systems according to some embodiments.

FIG. 15A shows an illustrative penetration testing system 100 for testing a network node $110_1$. The penetration testing system 100 comprises a remote computing device 189, first, second and third non-transitory computer-readable storage media 121, 122, 123 containing respective first, second and third program instructions. Examples of non-transitory computer-readable storage media known in the art include magnetic, optical and solid-state storage media. In the non-limiting example of FIG. 15A, the first and second storage media 121, 122 are included in or physically connected to network node $110_1$, and the third storage medium 123 is included in or physically connected to the remote computing device 189. The subscript in $110_1$ indicates, as was the case with network nodes 110 in FIG. 2, that this is network node #1 out of a plurality of network nodes in a networked system (NOT SHOWN). Network node $110_1$ is preferably in electronic communication with the remote computing device 189, via connection 107. Connection 107 can comprise any of the wired or wireless connection methods known, and remote computing device 189 can be part of the networked systems of nodes 110 or can be external to the networked system and configured to access the network nodes through the Internet, through a virtual private network, through a physical connection or using any other suitable way. Additional network nodes 110 of the networked system can be connected to the remote computing device 189 in the same manner of network node $110_1$ (NOT SHOWN).

Figure 15B:
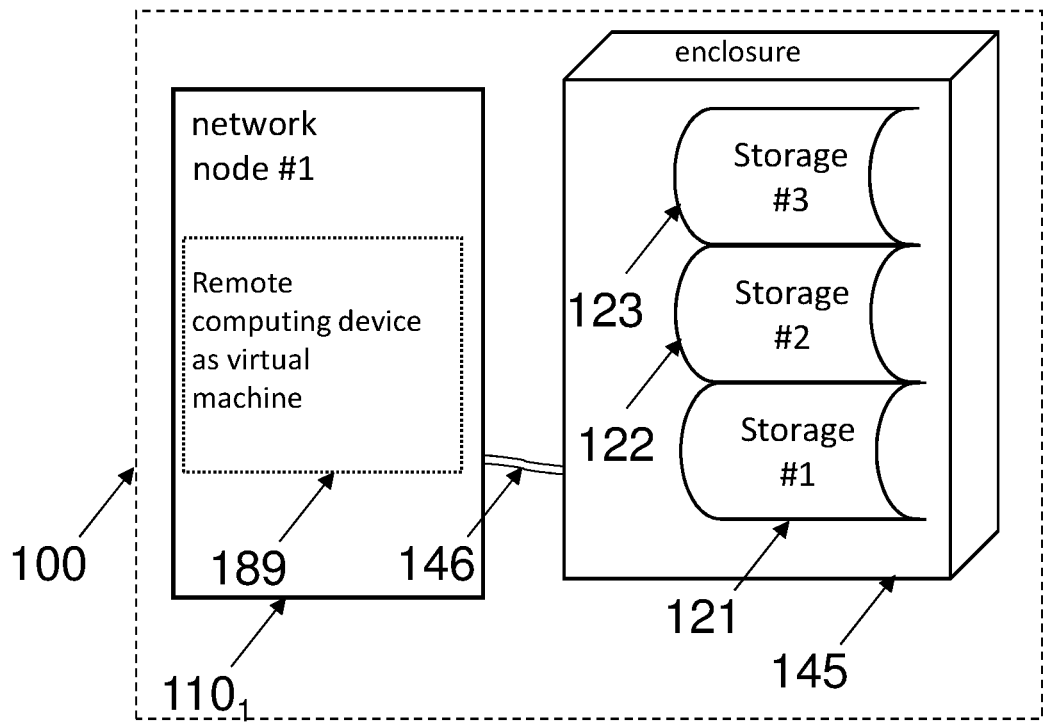

FIG. 15B illustrates an alternative embodiment of a penetration testing system 100 for testing a network node $110_1$ in which a penetration testing software module is executed in the targeted network node $110_1$, in remote computing device 189, which in this example is not a physically remote machine but rather a virtual machine installed in the network node $110_1$ and operating on top of the hosting operating system of the network node $110_1$. The penetration testing system 100 comprises, in addition to the remote computing device 189, first, second and third non-transitory computer-readable storage media 121, 122 and 123. In this alternative embodiment, first, second and third non-transitory computer-readable storage media 121, 122 and 123 are all located in the same physical location and/or, in some embodiments, are all located in the same physical enclosure 145, and/or, in some embodiments, are the same non-transitory computer-readable storage medium. In the non-limiting example of FIG. 15B, there is shown an electronic communication channel 146 between first, second and third non-transitory computer-readable storage media 121, 122 and 123 and network node $110_1$, but in another example (NOT SHOWN) the enclosure 145 can be physically installed within network node $110_1$. Depending on the location, the electronic communication can be by wired or wireless means, and may or may not be part of a larger network.

In some embodiments, a penetration testing system 100 of either of FIG. 15A or 15B for testing a network node $110_1$ on which a reconnaissance agent software module is installed, comprises a remote computing device 189, and first, second and third non-transitory computer-readable storage media 121, 122 and 123. A penetration testing software module of the penetration testing system is installed on the remote computing device. The remote computing device 189 is in electronic communication with network node $110_1$, via connection 107, which can comprise any of the wired or wireless connection methods known.

Figure 16A:
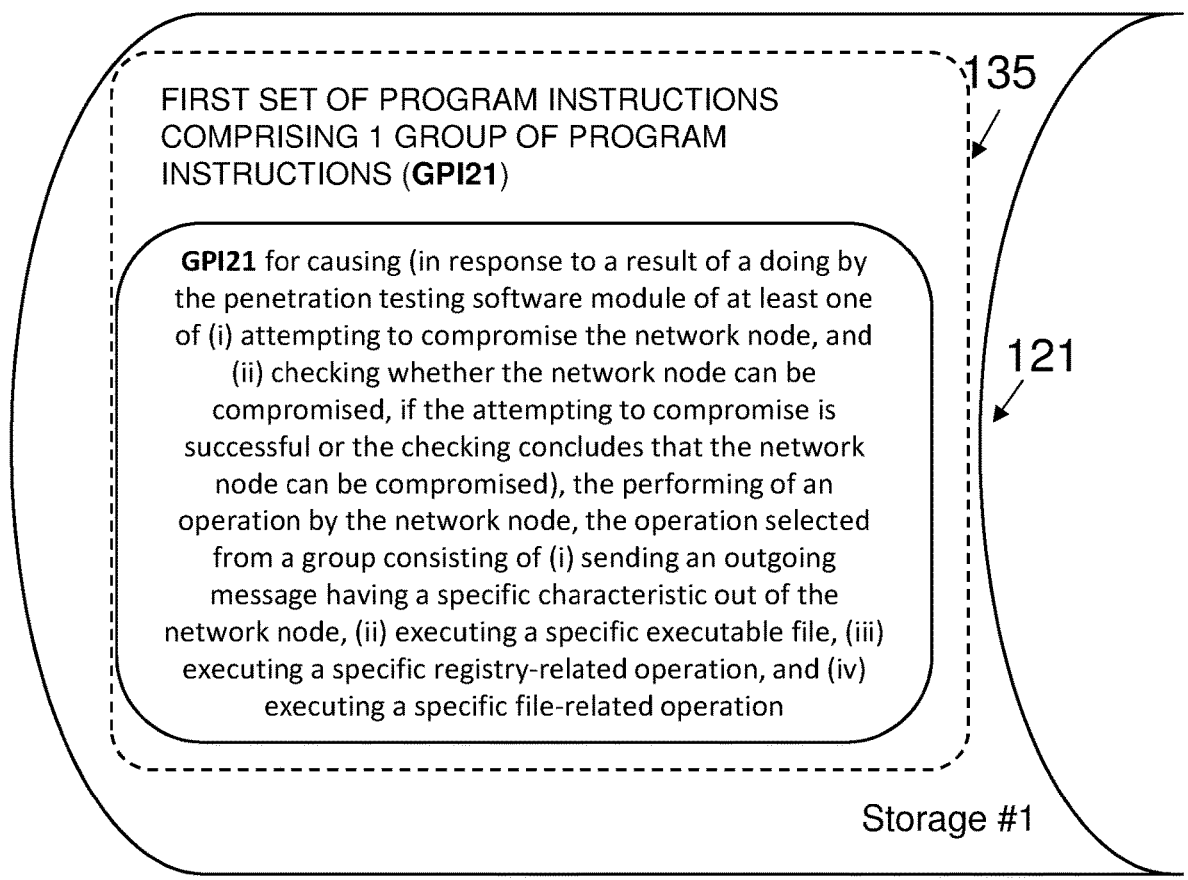
FIGS. 16A, 16B and 16C show schematic representations of computer-readable storage media and groups of program instructions stored thereon, according to some embodiments.

Referring now to FIG. 16A, first non-transitory computer-readable storage medium 121 contains first program instructions 135, wherein execution of the first program instructions 135 by one or more computer processors causes the one or more computer processors to carry out a portion of a method of penetration testing of a network node by a penetration testing system. The first program instructions 135 comprise one group of program instructions GPI21, which includes program instructions for causing (in response to a result of a doing by the penetration testing software module of at least one of (i) attempting to compromise the network node, and (ii) checking whether the network node can be compromised, if the attempting to compromise is successful or the checking concludes that the network node can be compromised), the performing of an operation by the network node, the operation selected from a group consisting of (i) sending an outgoing message having a specific characteristic out of the network node, (ii) executing a specific executable file, (iii) executing a specific registry-related operation, and (iv) executing a specific file-related operation.

Figure 16B:
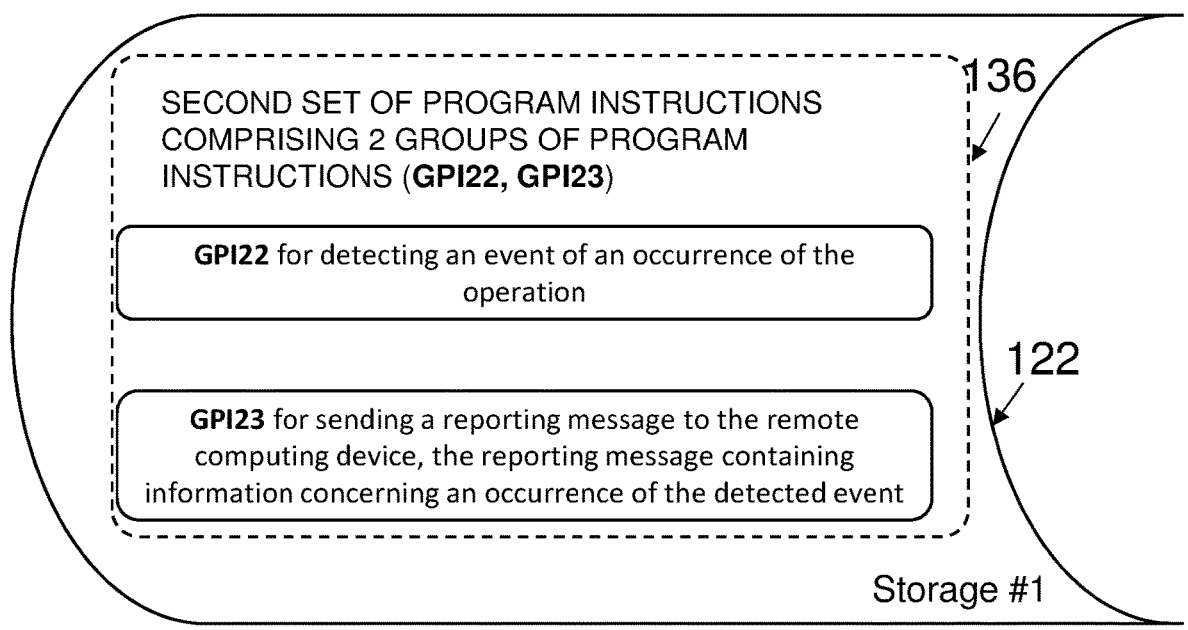

Referring to FIG. 16B, second non-transitory computer-readable storage medium 122 contains second program instructions 136, wherein execution of the second program instructions 136 by one or more processors of the network node 110$_1$ causes the one or more processors of the network node 110$_1$ to carry out portions of a method of penetration testing of a network node by a penetration testing system. The second program instructions 136 comprise two groups of program instructions GPI22, GPI23, where each group of program instructions GPI22, GPI23 includes the program instructions for carrying out one portion of the method, the two groups comprising:

a. Group of program instructions GPI22 including program instructions for detecting an event of an occurrence of the operation (i.e, the operation referred to above with respect to the discussion of the group of program instructions GPI21 and FIG. 16A). The detecting is preferably carried out by the reconnaissance agent software module installed in the network node 110$_1$.

b. Group of program instructions GPI23 including program instructions for sending a reporting message to the remote computing device, the reporting message containing information concerning an occurrence of the detected event. The sending is preferably carried out by the reconnaissance agent software module installed in the network node 110$_1$.

Figure 16C:
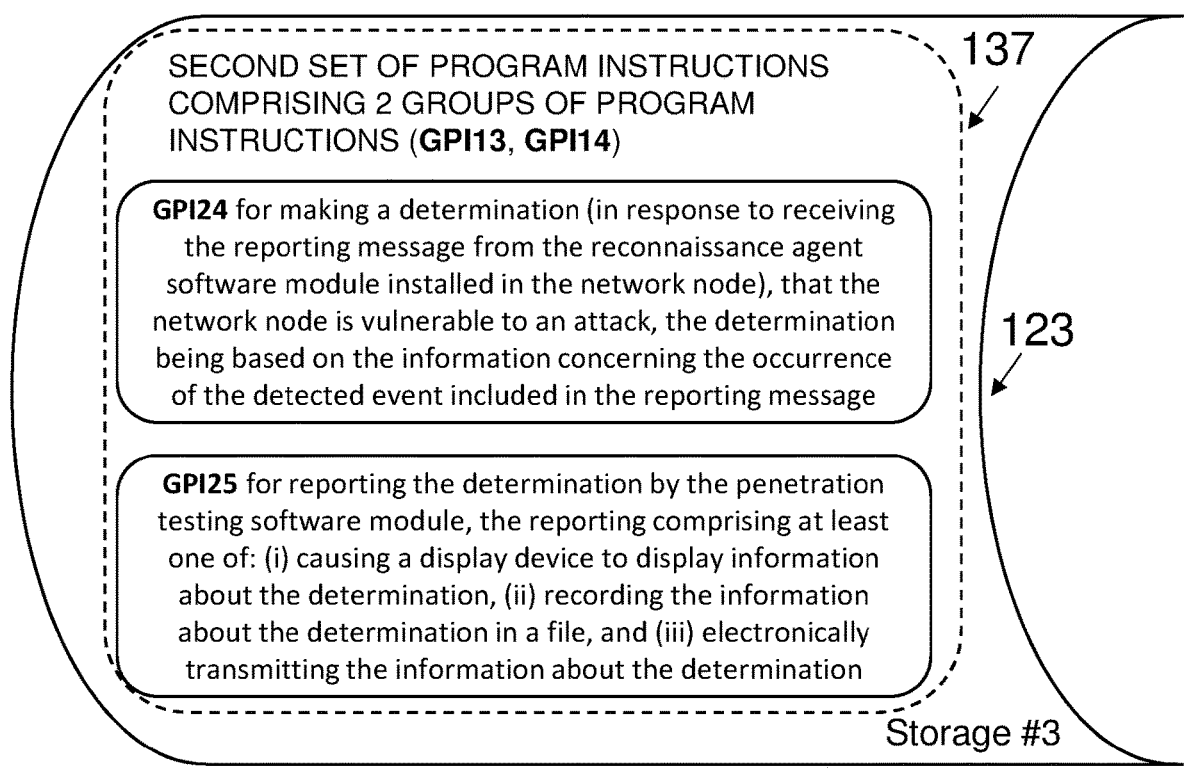

Referring to FIG. 16C, third non-transitory computer-readable storage medium 123 contains second program instructions 137, wherein execution of the third program instructions 137 by one or more processors of the remote computing device 189 causes the one or more processors of the remote computing device 189 to carry out portions of a method of penetration testing of a network node by a penetration testing system. The third program instructions 137 comprise two groups of program instructions GPI24, GPI25, where each group of program instructions GPI24, GPI25 includes the program instructions for carrying out one portion of the method, the two groups comprising:

a. Group of program instructions GPI24 including program instructions for making a determination (in response to receiving the reporting message from the reconnaissance agent software module installed in the network node), that the network node is vulnerable to an attack, the determination being based on the information concerning the occurrence of the detected event included in the reporting message. The determination is made by the penetration testing software module 168.

b. Group of program instructions GPI14 including program instructions for reporting the determination by the penetration testing software module, the reporting comprising at least one of: (i) causing a display device to display information about the determination, (ii) recording the information about the determination in a file, and (iii) electronically transmitting the information about the determination.

It will be obvious to the skilled practitioner that any of the features associated with embodiments of the method illustrated in FIG. 11 and disclosed in the earlier discussion with respect to those embodiments will be equally applicable to the analogous program instruction groups disclosed in FIGS. 16A, 16B and 16C and the accompanying discussion.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

Definitions

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.

2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.

7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation".

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system.

The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign"—A specific run of a specific test of a specific networked system by the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

An information item of a campaign is either a primary information item of the campaign or a secondary information item of the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "primary information item of a campaign"—An information item of the campaign which is completely independent of previously selected values of other information items of the campaign. In other words, the options available to a user for selecting the value of a primary information item of the campaign are not dependent on any value previously selected for any another information item of the campaign. For example, the options available to the user for selecting a goal of the attacker are independent of values previously selected for any other information item of the campaign, and therefore the goal of the attacker is a primary information item of the campaign.

22. "secondary information item of a campaign"—An information item of the campaign which depends on at least one previously selected value of another information item of the campaign. In other words, the options available to a user for selecting the value of a secondary information item of the campaign depend on at least one value previously selected for another information item of the campaign. For example, the options available to the user for selecting a capability of an attacker may depend on the previously selected value of the type of the attacker. For a first type of attacker the available capabilities to select from may be a first group of capabilities, while for a second type of attacker the available capabilities to select from may be a second group of capabilities, different from the first group. Therefore, a capability of the attacker is a secondary information item of the campaign.

23. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

24. "pre-defined scenario", "scenario template" or "template scenario"—A scenario that exists in storage accessible to a penetration testing system before the time a campaign is started, and can be selected by a user of the penetration testing system for defining a campaign of penetration testing.

A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.

A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

25. "attacker" or "threat actor"—An entity, whether a single person, a group of persons or an organization, that might conduct an attack against a networked system by penetrating it for uncovering its security vulnerabilities and/or for compromising it.

26. "a type of an attacker"—A classification of the attacker that indicates its main incentive in conducting attacks of networked systems. Typical values for a type of an attacker are state-sponsored, opportunistic cyber criminal, organized cyber criminal and insider.

An attacker can have only a single type.

27. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.

An attacker can have one or multiple capabilities.

28. "a goal of an attacker"—What the attacker of a campaign is trying to achieve when attacking a targeted networked system. In other words, what is the criterion according to which it will be judged whether the attack was a success or a failure and/or to what extent was it a success or a failure. Selecting a type of an attacker may cause a default selection of a goal for that attacker, but the user may have an option to override the default selection. An attacker can have one or multiple goals.

29. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

30. "penetration testing by actual attack" or "actual attack penetration testing" or "penetration testing by actual exploit" or "actual exploit penetration testing"—Penetration testing in which (i) the functionality of the reconnaissance function is fully implemented by (A) software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

31. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.

32. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

33. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

34. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

35. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

36. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".
37. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.
38. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.
39. "resource of a networked system"—A file in a network node of the networked system, a folder in a network node of the networked system, credentials of a user of the networked system, a peripheral device of a network node of the networked system, or a peripheral device directly attached to a network of the networked system.
40. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.
41. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.
42. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.
43. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.
44. "session-hijacking attack"—a cyber-attack where a valid communication session between two network nodes in a networked system is used by an attacker to gain unauthorized access to information or services in the networked computer system.
45. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.
46. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

47. "administrator of a network node"—Any person that is authorized, among other things, to define or change at least one rule controlling at least one of an access right, a permission, a priority and a configuration in the network node.
48. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.
49. "remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

50. "damaging a file"—Changing the file in a way that the file cannot be recovered to its original form without having extra information. Examples of specific ways of damaging a file are (i) deleting the file, (ii) removing the first 100 bytes of the file, (iii) changing the order of bytes in the file (without removing any of them), (iv) encrypting the file using a secret key, etc.

Note that changing the access rights of a file is not considered damaging the file.

51. "explicitly selecting"—Directly and clearly selecting, by a human user, of one option out of multiple options available to human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

52. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

53. "macro language"—A programming language which is embedded inside a software application (e.g., inside a word processor or a spreadsheet application). A software application in which a macro language is embedded is said "to support the macro language", and is a "macro-supporting software application".
54. "macro"—A sequence of commands written in a macro language.
55. "auto-executing macro"—A macro that is embedded inside a given file, is written in a macro language that is embedded inside a given software application, and is automatically executed whenever the given file is opened by the given software application. A file in which an auto-executing macro is embedded is said "to contain the auto-executing macro".
56. "macro-based security vulnerability" or "macro-based vulnerability"—A security vulnerability of a network node which requires execution of an auto-executing macro in the network node in order to cause the network node to become compromised.
57. "macro-based attack"—An attack of a network node attempting to exploit a macro-based security vulnerability.

58. "phishing"—An attempt to obtain sensitive information such as usernames, passwords, credit card details, or other confidential information (and in some cases indirectly obtain money), by disguising as a trustworthy entity in an electronic communication or by other misleading means. The electronic communication means may be emails, SMS messages, social network messages, and the like. Phishing is not limited to using electronic communication means for causing access to the malicious phishing code, and also includes using other misleading means, for example, using innocent-looking portable drives (e.g. USB thumb drives) and using social means like phone calls in which the user is tempted to visit a web page containing the malicious phishing code.

59. "spear phishing"—An attempt of phishing directed at specific individuals or companies.

60. "selecting a link"—Making an operation by a user that causes following the link to a destination pointed to by the link. Typically, selecting a link is achieved by pointing a visible cursor to the link and clicking a button on a pointing device (e.g. a mouse). However, there are other ways of selecting a link, for example by moving a selection indicator until the link is marked as selected and then hitting a selection button (e.g. an "Enter" button in a keyboard or an "OK" button in a remote-control device).

61. "opening a file"—If the file is an executable file, then opening it means executing it. If the file is not an executable file, then opening it means creating by the operating system at least one data structure associated with the file, the one or more data structures used for enabling a software application to read or write data from/to the file.

62. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.

In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

63. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

64. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

65. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

66. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

The invention claimed is:

1. A method of penetration testing of a network node by a penetration testing system, the penetration testing system comprising (A) a reconnaissance agent software module installed in the network node, and (B) a penetration testing software module installed on a remote computing device, the method comprising:
   a. sending to the network node, by the penetration testing software module, a test message containing at least one member selected from the group consisting of an Internet link and an attachment file;
   b. detecting, in the network node and by the reconnaissance agent software module installed in the network node, an event occurring in the network node, the event being a member of the group consisting of an event of selecting of the Internet link by a user of the network node, an event of opening of the attachment file by the user of the network node, an event caused by the selecting of the Internet link, and an event caused by the opening of the attachment file;
   c. sending, by the reconnaissance agent software module installed in the network node, a reporting message to the remote computing device, the reporting message containing information concerning an occurrence of the detected event;
   d. making a determination, by the penetration testing software module, that the network node is vulnerable to an attack, the determination being based on the information concerning the occurrence of the detected event included in the reporting message; and e. reporting the determination by the penetration testing software module, the reporting comprising at least one operation selected from the group consisting of: (i) causing a display device to display information about the determination, (ii) recording the information about the determination in a file, and (iii) electronically transmitting the information about the determination.

2. The method of claim 1, wherein the detected event is one member of the group consisting of the event of selecting the Internet link and the event caused by the selecting of the Internet link.

3. The method of claim 1, wherein the detected event is one member of the group consisting of the event of opening the attachment file and the event caused by the opening of the attachment file.

4. The method of claim 2, wherein the Internet link comprises an invalid or inactive Internet address.

5. The method of claim 2, wherein the Internet link is contained in a body of the test message.

6. The method of claim 2, wherein the Internet link is contained in a file attached to the test message.

7. The method of claim 1, wherein the detecting of the event comprises detecting an outgoing message sent by the network node and having a specific characteristic.

8. The method of claim 7, wherein the specific characteristic of the outgoing message includes a specific characteristic of the content of the outgoing message.

9. The method of claim 7, wherein the specific characteristic of the outgoing message includes a specific characteristic of the address to which the outgoing message is being sent.

10. The method of claim 9, wherein the outgoing message is an email message and the specific characteristic of the address is that the address is a loopback address.

11. The method of claim 1, wherein the detecting of the event comprises detecting an execution of a specific executable file by the network node.

12. The method of claim 1, wherein the detecting of the event comprises detecting a specific registry-related operation.

13. The method of claim 1, wherein the detecting of the event comprises detecting a specific file-related operation.

14. A penetration testing system for testing a network node on which a reconnaissance agent software module is installed, the penetration testing system comprising:

a. a remote computing device in electronic communication with the network node and comprising one or more processors, wherein a penetration testing software module of the penetration testing system is installed on the remote computing device;

b. a first non-transitory computer-readable storage medium containing first program instructions, wherein execution of the first program instructions by one or more processors of the network node causes the one or more processors of the network node to carry out the following:

i. in response to receiving, from the penetration testing software module installed on the remote computing device, a test message containing at least one member selected from the group consisting of an Internet link and an attachment file, detecting, in the network node and by the reconnaissance agent software module, an event occurring in the network node, the event being a member of the group consisting of an event of selecting of the link by a user of the network node, an event of opening of the attachment file by the user of the network node, an event caused by the selecting of the link, and an event caused by the opening of the attachment file, and ii. sending, by the reconnaissance agent software module, a reporting message to the remote computing device, the reporting message containing information concerning an occurrence of the detected event; and c. a second non-transitory computer-readable storage medium containing second program instructions, wherein execution of the second program instructions by one or more processors of the remote computing device causes the one or more processors of the remote computing device to carry out the following:

i. in response to receiving the reporting message from the reconnaissance agent software module installed in the network node, making a determination, by the penetration testing software module, that the network node is vulnerable to an attack, the determination being based on the information concerning the occurrence of the detected event included in the reporting message, and ii. reporting the determination by the penetration testing software module, the reporting comprising at least one operation selected from the group consisting of: (i) causing a display device to display information about the determination, (ii) recording the information about the determination in a file, and (iii) electronically transmitting the information about the determination.

* * * * *